(12) United States Patent
Moren et al.

(10) Patent No.: US 8,887,757 B2
(45) Date of Patent: Nov. 18, 2014

(54) WAFER CHECK VALVE ASSEMBLY AND RELATED METHODS OF USE

(75) Inventors: Gary A. Moren, Advance, NC (US); Joshua Lee Hoots, Clemmons, NC (US); Jon Terence Stone, Clemmons, NC (US); Paul M. Gutmann, Lewisville, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 161 days.

(21) Appl. No.: 13/418,048

(22) Filed: Mar. 12, 2012

(65) Prior Publication Data
US 2013/0233412 A1    Sep. 12, 2013

(51) Int. Cl.
*F16K 15/00* (2006.01)
(52) U.S. Cl.
USPC ........................................ 137/515.7; 137/527
(58) Field of Classification Search
CPC .......... F16K 1/18; F16K 15/03; F16K 15/033
USPC ............................ 137/515, 515.7, 527, 527.8
See application file for complete search history.

(56) References Cited

U.S. PATENT DOCUMENTS

| | | | | |
|---|---|---|---|---|
| 1,000,719 | A | * | 8/1911 | Cram .............................. 210/117 |
| 4,427,025 | A | * | 1/1984 | Prince ......................... 137/527.4 |
| 4,852,607 | A | | 8/1989 | Scaramucci |
| 5,713,389 | A | * | 2/1998 | Wilson et al. .............. 137/515.7 |
| 7,249,611 | B2 | * | 7/2007 | Scaramucci et al. ........ 137/527.2 |
| 2005/0121085 | A1 | | 6/2005 | Levey et al. |
| 2008/0179051 | A1 | | 7/2008 | Willis et al. |

FOREIGN PATENT DOCUMENTS

| | | |
|---|---|---|
| WO | WO99/32816 | 7/1999 |
| WO | WO2011/047437 | 4/2011 |

OTHER PUBLICATIONS

Swing Check Valves, N° 04/EURO—Edition: Feb. 2007—D.L.B—44678-2007-Copyright © Cepex Holding, S.A. (2007).
Georg Fischer Type 369 Wafer Check Valve, Item #M175 (Jul. 2007) © Georg Fischer LLC 2007.
K4 Swing Check Valve © Praher Canada Products Ltd (2009).
S4 Wafer Check Valve—PVC, PP, PVDF, © Praher Canada Products Ltd. 2008.
Wafer Check Valves, Asahi/America, pp. 90-91, Rev. F Aug. 2011.
Co-Pending European Patent Appln. No. 13158691 (as published as EP2639481), claiming priority to the present U.S. Appl. No. 13/418,048.
European Search Report mailed Jun. 26, 2014 in connection with co-pending European Patent Appln. No. 13158691 (corresponding to Item No. 5 above).

* cited by examiner

*Primary Examiner* — John Rivell
*Assistant Examiner* — R. K. Arundale
(74) *Attorney, Agent, or Firm* — McCarter & English, LLP

(57) ABSTRACT

Provided is a wafer check valve assembly comprising a body having a mating side including first, second and third surfaces and a shaft groove, a tapered surface of the mating side extends from the third surface toward an inlet side of the body and from a first end to a second end of a port opening; a retainer having a mating side including fourth, fifth and sixth surfaces; and a disc with a shaft; wherein, when the body, retainer and disc are mated together: the shaft is housed between the body and the retainer and within the shaft groove, the first and fourth surfaces are proximal, the second and fifth surfaces are proximal, and the third and sixth surfaces proximal, so to define a pocket housing a gasketing material to form a seal between the body and retainer and to secure together the body, retainer, and disc.

32 Claims, 27 Drawing Sheets

WAFER CHECK VALVE ASSEMBLY AND RELATED METHODS OF USE

BACKGROUND

1. Technical Field

The present disclosure generally relates to flow control assemblies for fluid systems, and more particularly, to wafer check valve assemblies for piping systems.

2. Background Art

Flow control assemblies for use in fluid systems are known. For example, assemblies utilizing flow control devices (e.g., valves) in fluid systems (e.g., piping systems) have been developed. Flow control assemblies are useful in a myriad of different environments for commercial and industrial applications.

In general, wafer check valves are a type of flow control device and usually include a body component, a disc or flapper component, a means to attach the disc component to the body component, and a seal or seat. These valves typically also include a hinge or shaft, which may be an integral feature of the disc component, or may be a separate component, which for example, is inserted through the disc component and allows the disc to rotate on the shaft. Disc components and shafts are commonly attached to (or retained within) the body of the valve via various means (e.g., via fasteners, retainer rings, threaded bushings, pins, welding, etc.), depending on the design and/or materials of construction of the valve.

One primary purpose of wafer check valves is to prevent ("check") back flow, or reversal of flow in piping systems. This checking action may be necessary, for example, when used on the discharge side of a pump, to prevent drainage of a system upon pump shutoff, or if used on the suction side of a pump, to retain "prime" in the system. In general, the field of wafer check valves has a long history with many types of designs and materials of construction. Wafer check valves are sometimes referred to as, or included as a sub-class of valves known as, swing check valves. While metal wafer check valves have generally dominated the field for over 100 years, thermoplastic wafer check valves have also been introduced within the past few decades.

Wafer check valves are typically narrow profile (short length) valves with minimal overall thickness. The body of these valves generally resembles a wafer or a disc, thus the name wafer check valve. These valves are typically installed in systems for at least two primary reasons: first, wafer check valves are installed where space is a premium—their narrow profile generally allows installation in tight spaces; and second, due to the narrow profile and minimum amount of material needed for their construction, these valves are typically lower cost than alternatives such as swing check valves or ball check valves.

In general, wafer check valves are uni-directional and are installed into piping systems between two flanges. Wafer check valves are typically designed to operate in response to the force of flow of fluids. They are also typically dependent upon gravity and/or fluid momentum to close and open. For example, for a system at rest, with the wafer check valve installed in a vertical pipe installation, the weight of the water column above the valve acts on the disc of the valve, holding it in the closed position. Once forward flow in the system is started, the disc component of the wafer check valve opens in response to the pressure and flow generated by the pump and allows flow through the system. Upon pump shutdown, gravity overcomes the forward momentum of the fluid and the fluid reverses its direction of flow. The disc component of the wafer check valve rides the column of water downward until it reaches the closed position, at which point the hydraulic head generated by the weight of the water column above the valve acts on the valve seat, and a seal is generated, whereby, no, or minimal, additional fluid is allowed past the disc component.

Wafer check valves are also installed in piping systems where the general orientation of the pipe is horizontal. In these installations, for most conventional wafer check valves, the use of a spring (typically a torsion spring, but could also be a compression or other spring) attached to the disc component is known to be typically required to bias the disc component toward the closed position, such that when the system is shut off and flow reversal occurs, the spring will move the disc component toward the closed position until sufficient hydraulic head can be generated to effect a seal. Other devices such as counterweights and/or externally mounted springs attached to the shaft of the valve are known in the art for the purpose of assisting wafer check valves to affect a seal when installed in the horizontal orientation, as well as to dampen the response of the disc component upon system startup. In general, these devices can typically only be used where the shaft of the valve extends through the walls of the body of the valve.

There are several issues, flaws and/or shortcomings with prior art designs. First, wafer check valves are generally notorious for their reduced flow port area (i.e., restricted flow). Ports are typically as little as 40% of the open area of the adjoining pipe, effectively creating a nozzle through the port of the wafer check valve.

Additionally, many wafer check valves require the use of a spacer or spool piece on the downstream side of the valve to allow the disc to open to its full extent, especially in piping systems greater than schedule 40. Typically, if spacers are not used, the rotation of the disc may be restricted, which further restricts the flow of fluid through the valve. The spacer is a general nuisance for several reasons: first, the requirement for spacers is often not anticipated nor understood by users; second, installation becomes more difficult, as another independent component must be handled and managed while attempting to install the valve and spacer between two flanges; third, the actual space in a system required to properly install wafer check valves (with spacers) is often underestimated, requiring last minute system design adjustments, sometimes additional cost, and/or compromising system performance by using the wafer check valve under less than ideal installation conditions (e.g., without a spacer), resulting in restricted flow in the system.

Moreover, installation of valves without spacers can result in the disc striking the inside wall of the adjoining flange or pipe. This can result in restricted opening of the disc, as well as damage to the disc, and possibly even failure of the disc.

Furthermore and typically with respect to thermoplastic wafer check valves, the disc to shaft transition is often the weakest link of the valve, resulting in failure of the disc due to rapid flow reversal and the associated impact loading of the disc. Additionally (and also typically with respect to thermoplastic wafer check valves), the discs of existing prior art valves are generally retained in the body using plastic fasteners, press-fit buttons or the like, or special clips. These methods typically rely, to some extent, on the proper assembly of the valve between the two adjoining flanges to assist the retention means, whereas, improper installation between the flanges (i.e., misalignment) can result in one, or both, of the retainers coming loose and allowing the disc to dislodge from the assembly.

Furthermore, conventional thermoplastic wafer check valve designs typically rely on the installer to ensure proper compression of the valve, especially the body, when the flange bolts are tightened. Excessive torque, improper bolt tightening sequence, and/or misalignment can all result in deficiencies in valve performance. By contrast, due to the differences in the strength of metal and plastic materials, metal valves are generally not as sensitive to factors associated with installation as are thermoplastic valves.

Moreover, as a result of the generally thin profile of the bodies of conventional wafer check valves and by the necessity of maintaining a narrow face-to-face profile, the seat area is often placed on a plane parallel to the front and back faces of the valve body. When installed in piping systems that are horizontal, the disc component of these valves typically hangs straight down and generally cannot render any mechanical sealing advantage from gravitational forces, thereby typically requiring the assistance of a spring to return to the closed and seated position once flow in the system terminates.

Thus, despite efforts to date, a need remains for improved systems/designs for wafer check valve assemblies for fluid systems. These and other inefficiencies and opportunities for improvement are addressed and/or overcome by the systems, assemblies and methods of the present disclosure.

SUMMARY

The present disclosure provides for improved flow control assemblies for fluid systems. More particularly, the present disclosure provides for advantageous wafer check valve assemblies for fluid systems (e.g., piping systems or the like). In exemplary embodiments, the present disclosure provides for advantageous wafer check valve assemblies that include an angled sealing surface, which allows the disc member to seal even with the valve assembly in the horizontal position, and/or to seal without the aid of a spring.

In general, angling the sealing surface allows the center of gravity of the disc member to be used for a mechanical advantage when the valve is installed in a horizontal orientation. With the valve installed in the horizontal orientation, the natural bias of the disc member is to drop down into the sealing surface. The center of gravity of the disc member in a free-hanging condition is inside of the angle of the sealing surface, so that the seal surface effectively catches the disc member before it is allowed to reach its gravitationally natural position, thus using the center of gravity of the disc member advantageously to affect a seal with the valve installed in a horizontal orientation.

The present disclosure provides for a wafer check valve assembly including a body member having a mating side and an inlet side, the body member mating side including first, second and third mating surfaces and a shaft groove; a retainer member having a mating side and an outlet side, the retainer member mating side including fourth, fifth and sixth mating surfaces and a first gasketing material positioned proximal to the fifth mating surface; a disc member provided with a shaft member; wherein when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, (iv) at least a portion of the third and sixth mating surfaces are positioned proximal to one another to define a mating pocket that houses the first gasketing material, the first gasketing material thereby forming a seal between the body member and the retainer member to releasably secure the body member, retainer member and the disc member together.

The present disclosure also provides for a wafer check valve assembly wherein the body member is hollow and defines a port opening, the body member having a sealing surface proximal to the port opening; wherein the retainer member is hollow and defines an outlet opening; wherein the disc member includes a body portion having a groove housing a second gasketing material, the shaft member extending from the body portion; and wherein the rotatably housed disc member is allowed to rotate between: (i) a closed position where the second gasketing material forms a seal with the sealing surface to fluidically seal the port opening, and (ii) an open position where the body portion of the disc member is positioned to allow fluid to flow from the port opening to the outlet opening.

The present disclosure also provides for a wafer check valve assembly wherein the port opening and the body portion of the disc member define a shape that is selected from the group consisting of a substantially oval shape, a substantially egg shape and a substantially tear-drop shape.

The present disclosure also provides for a wafer check valve assembly wherein the inlet side of the body member includes a seventh mating surface having a first seal groove housing a third gasketing material; wherein the outlet side of the retainer member includes an eighth mating surface having a second seal groove housing a fourth gasketing material; and wherein the seventh mating surface and the third gasketing material are configured to form a seal with a first flange member of a fluid system and the eighth mating surface and the fourth gasketing material are configured to form a seal with a second flange member of the fluid system.

The present disclosure also provides for a wafer check valve assembly wherein the inlet side of the body member includes a flow transition area that extends and tapers from an outer edge proximal to the seventh mating surface to an inner edge proximal to the port opening.

The present disclosure also provides for a wafer check valve assembly wherein a tapered surface of the mating side of the body member extends from the third mating surface of the body member toward the inlet side of the body member from a first end of the port opening to a second end of the port opening. The present disclosure also provides for a wafer check valve assembly wherein a first axis is defined by and extends through the mating of the third and sixth mating surfaces; and wherein the angle of taper of the tapered surface of the mating side of the body member is from about 1° to about 45° relative to the first axis. The present disclosure also provides for a wafer check valve assembly wherein the angle of taper of the tapered surface of the mating side of the body member is about 12° relative to the first axis.

The present disclosure also provides for a wafer check valve assembly wherein the tapered surface of the mating side of the body member defines a second axis; and wherein the sealing surface extends from the tapered surface of the mating side to the port opening on the inlet side at an angle from about 12° to about 60° relative to a third axis, the third axis transverse to the second axis. The present disclosure also provides for a wafer check valve assembly wherein the sealing surface extends from the tapered surface of the mating side of the body member to the port opening on the inlet side at an angle of about 20° relative to the third axis.

The present disclosure also provides for a wafer check valve assembly wherein the first end of the port opening is positioned a shorter distance away from the outlet side of the retainer member than the second end of the port opening when the body member and the retainer member are releasably mated together.

The present disclosure also provides for a wafer check valve assembly wherein the third mating surface of the body member includes at least one pocket; wherein the sixth mating surface of the retainer member includes at least one alignment boss extending therefrom; and wherein when the body member and the retainer member are releasably mated together, at least a portion of the at least one alignment boss is positioned within at least a portion of the at least one pocket to facilitate proper alignment of the mated body member and retainer member, and to substantially prevent rotation of the retainer member relative to the body member.

The present disclosure also provides for a wafer check valve assembly wherein the shaft groove extends from a first end to a second end, the second end larger in diameter than the first end; wherein the shaft member of the disc member extends from a first end to a second end, the second end larger in diameter than the first end; wherein the first end of the shaft groove inhibits from being housed therein the larger second end of the shaft member; and wherein when the disc member is rotatably housed within at least a portion of the shaft groove, the first end of the shaft member is positioned within the first end of the shaft groove and the second end of the shaft member is positioned within the second end of the shaft groove to facilitate proper alignment of the disc member relative to the body member.

The present disclosure also provides for a wafer check valve assembly wherein the larger second end of the shaft member includes a cap member. The present disclosure also provides for a wafer check valve assembly wherein the cap member is mounted with respect to the second end of the shaft member to prevent a spring member mounted with respect to the second end of the shaft member from sliding off of the second end of the shaft member. The present disclosure also provides for a wafer check valve assembly wherein the cap member is integral with the second end of the shaft member.

The present disclosure also provides for a wafer check valve assembly wherein the sixth mating surface of the retainer member includes at least one column member extending therefrom; and wherein when the body member, retainer member and disc member are releasably mated together, the at least one column member rotatably housing the shaft member between the body member and the retainer member and within at least a portion of the shaft groove, while substantially preventing the shaft member from moving in the lateral and axial directions.

The present disclosure also provides for a wafer check valve assembly wherein the sixth mating surface of the retainer member includes at least one rib member extending downwardly from the sixth mating surface toward the outlet opening, the at least one rib member including a first engagement surface; wherein the body portion of the disc member includes a rib member extending from a top surface, the disc member rib member including a second engagement surface; and wherein when the disc member is rotated to the open position, the engagement of the first and second engagement surfaces limits the travel of the disc member in the open position and substantially prevents contact between the disc member and an inside wall of a downstream pipe.

The present disclosure also provides for a wafer check valve assembly wherein the interior of the outlet opening of the retainer member proximal to the mating side of the retainer member includes an interior cylindrical section that extends from an inner edge of the mating side to an interior angled section that extends from the cylindrical section to an inner edge of the outlet side of the retainer member. The present disclosure also provides for a wafer check valve assembly wherein the body portion of the disc member extends from a first end to a second end, the first end having a smaller surface area than the second end.

The present disclosure also provides for a wafer check valve assembly wherein the body portion of the disc member includes a top surface and an extending portion that extends from a first end positioned on the top surface to a second end positioned: (i) beyond an outer edge of the body portion; and (ii) above the top surface. The present disclosure also provides for a wafer check valve assembly wherein the second end of the extending portion is proximal to and integral with the shaft member of the disc member.

The present disclosure also provides for a wafer check valve assembly wherein the shaft member of the disc member extends from a first end to a second end, the first end extending a further distance from the center of the shaft member than the second end. The present disclosure also provides for a wafer check valve assembly further including a cap member mounted with respect to the second end, the second end having the cap member mounted thereon extending substantially the same length from the center of the shaft member as the length of the first end extending from the center of the shaft member.

The present disclosure also provides for a wafer check valve assembly wherein the body portion of the disc member includes a top surface, a bottom surface, and a side surface that tapers inwardly from the top surface to the bottom surface; and wherein the groove of the disc member is positioned on the side surface.

The present disclosure also provides for a wafer check valve assembly wherein the top surface of the disc member defines a first axis; wherein the side surface tapers inwardly at an angle from about 12° to about 60° relative to a second axis, the second axis transverse to the first axis. The present disclosure also provides for a wafer check valve assembly wherein the disc member groove is configured to house the second gasketing material so that about 10% of the surface of the second gasketing material extends from the disc member groove.

The present disclosure also provides for a wafer check valve assembly further including a spring member mounted with respect to the shaft member of the disc member, the spring member extending from a first end to a second end; wherein the shaft member extends from a first end to a second end; wherein the body portion of the disc member includes a rib member extending: (i) from a top surface of the disc member, and (ii) from a first end to a second end; and wherein the first end of the spring member is configured to be mounted with respect to the second end of the shaft member, and the second end of the spring member is configured to be mounted with respect to the first end of the rib member.

The present disclosure also provides for a wafer check valve assembly including a hollow body member defining a port opening, the body member having a mating side, an inlet side and an angled sealing surface proximal to the port opening, the body member mating side including first, second and third mating surfaces and a shaft groove; a hollow retainer member defining an outlet opening, the retainer member having a mating side and an outlet side, the retainer member mating side including fourth, fifth and sixth mating surfaces and a first gasketing material positioned proximal to the fifth mating surface; a disc member having a body portion that includes a groove housing a second gasketing material, the body portion including a shaft member that extends from the body portion; wherein when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, (iv) at least a portion of the third and sixth mating surfaces are positioned proximal to one another to define a mating pocket that houses the first gasketing material, the first gasketing material thereby forming a seal between the body member and the retainer member to releasably secure the body member, retainer member and the disc member together; and wherein the rotatably housed disc member is allowed to rotate between: (i) a closed position where the second gasketing material forms a seal with the angled sealing surface to fluidically seal the port opening, and (ii) an open position where the body portion of the disc member is positioned to allow fluid to flow from the port opening to the outlet opening.

The present disclosure also provides for a wafer check valve assembly wherein a tapered surface of the mating side of the body member extends from the third mating surface of the body member toward the inlet side of the body member from a first end of the port opening to a second end of the port opening; wherein the tapered surface of the mating side of the body member defines a first axis; and wherein the sealing surface extends from the tapered surface of the mating side to the port opening on the inlet side at an angle from about 12° to about 60° relative to a second axis, the second axis transverse to the first axis.

The present disclosure also provides for a wafer check valve assembly wherein the port opening and the body portion of the disc member define a shape that is selected from the group consisting of a substantially oval shape, a substantially egg shape and a substantially tear-drop shape. The present disclosure also provides for a wafer check valve assembly wherein the body portion of the disc member includes a top surface, a bottom surface, and a side surface that tapers inwardly from the top surface to the bottom surface; wherein the groove of the disc member is positioned on the side surface; wherein the top surface of the disc member defines a third axis; and wherein the side surface tapers inwardly at an angle from about 12° to about 60° relative to a fourth axis, the fourth axis transverse to the third axis.

The present disclosure also provides for a wafer check valve assembly wherein the first end of the port opening is positioned a shorter distance away from the outlet side of the retainer member than the second end of the port opening when the body member and the retainer member are releasably mated together.

Additional advantageous features, functions and applications of the disclosed systems, assemblies and methods of the present disclosure will be apparent from the description which follows, particularly when read in conjunction with the appended figures.

BRIEF DESCRIPTION OF THE DRAWINGS

Exemplary embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
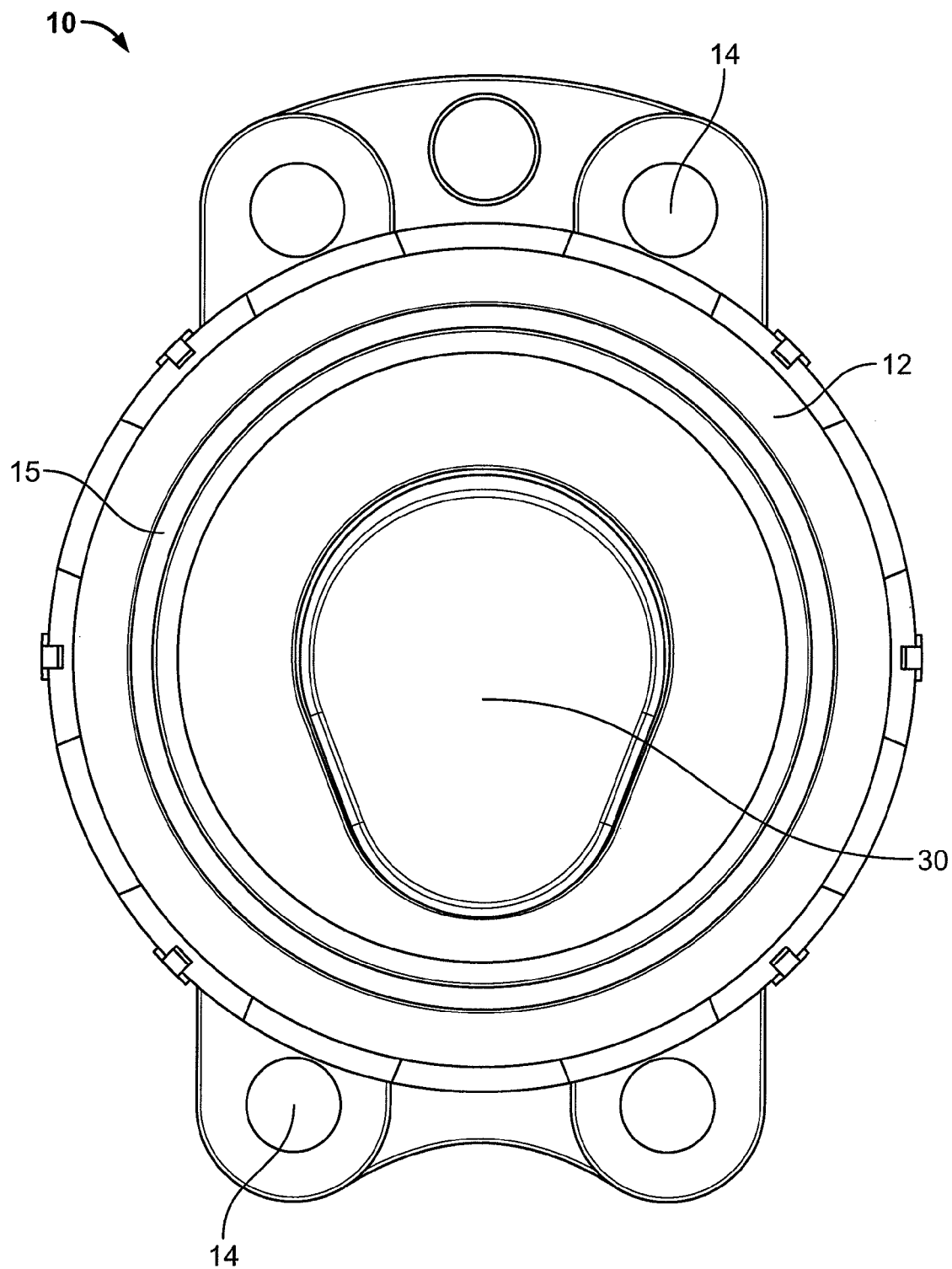
FIG. 1 is a front view of a wafer check valve assembly in accordance with an exemplary embodiment of the present disclosure.
Figure 2:
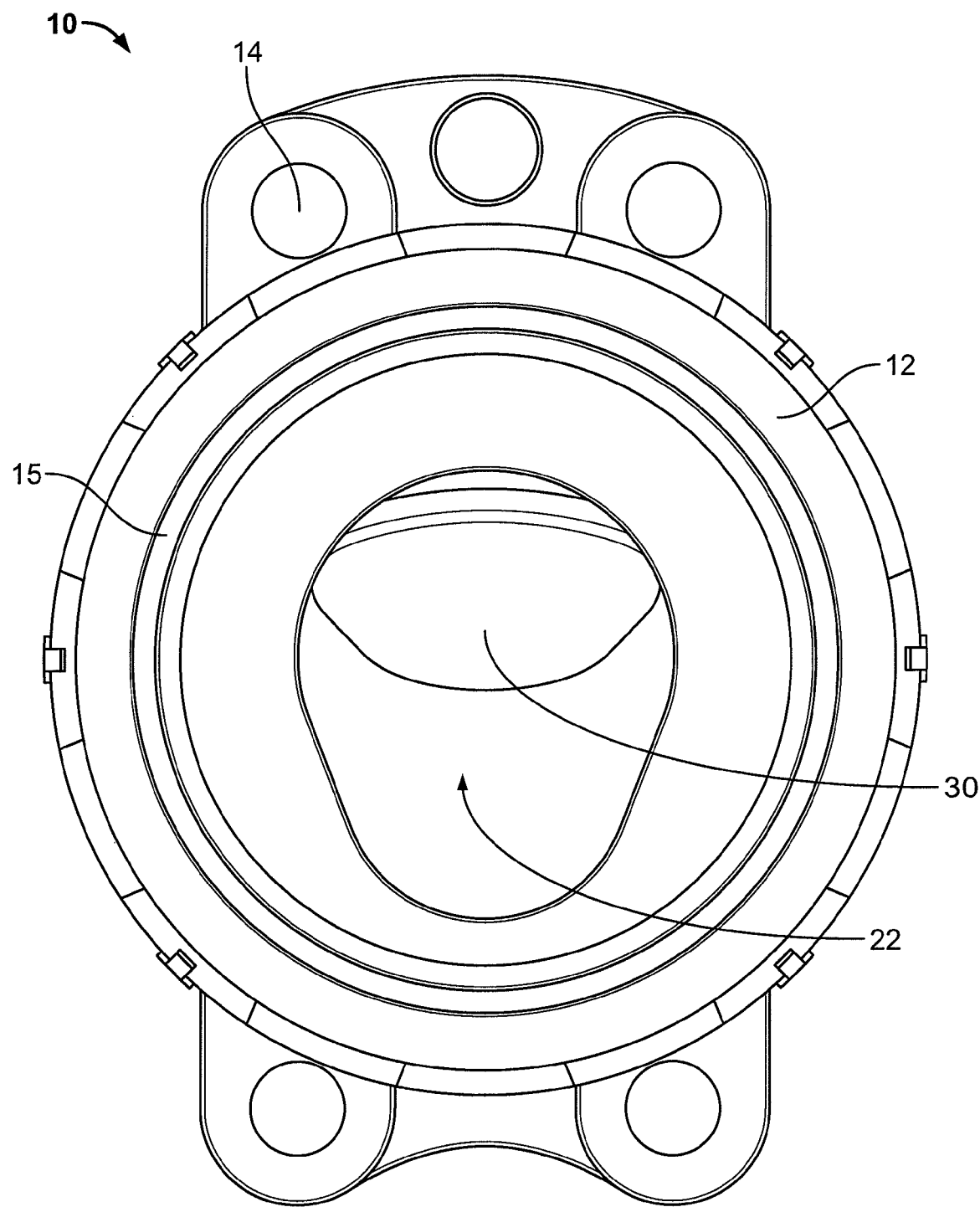
FIG. 2 is another front view of the wafer check valve assembly of FIG. 1.

In the description which follows, like parts are marked throughout the specification and drawings with the same reference numerals, respectively.

The present disclosure provides for advantageous flow control assemblies for fluid systems (e.g., industrial and/or commercial systems). More particularly, the present disclosure provides for convenient, low-cost and/or effective systems and methods for utilizing improved wafer check valve assemblies in fluid systems (e.g., piping systems or the like). In exemplary embodiments, the present disclosure provides for advantageous wafer check valve assemblies that include an angled sealing surface, which allows the disc member to seal even with the valve assembly in the horizontal position, and/or to seal without the aid of a spring.

Referring now to the drawings, there is illustrated an exemplary wafer check valve assembly 10. Wafer check valve assembly 10 typically includes a body member 12, a retainer member or end ring member 50 and a disc member or flapper member 30. In exemplary embodiments, assembly 10 also includes a cap member 70.

Figure 5:
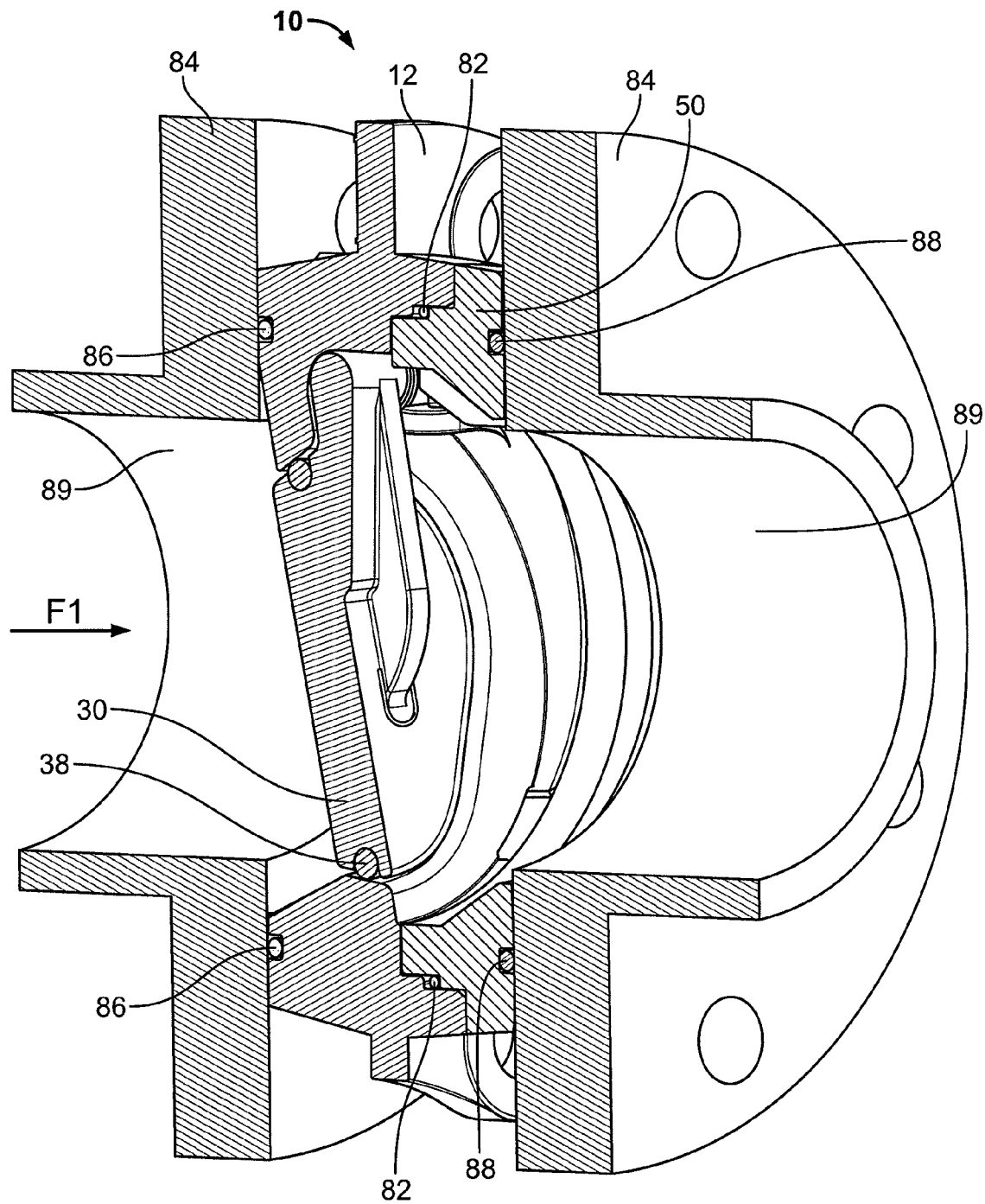
FIG. 5 is a cross-sectional side perspective view of the wafer check valve assembly of FIG. 1 mounted with respect to flanges of an exemplary piping system.
Figure 6:
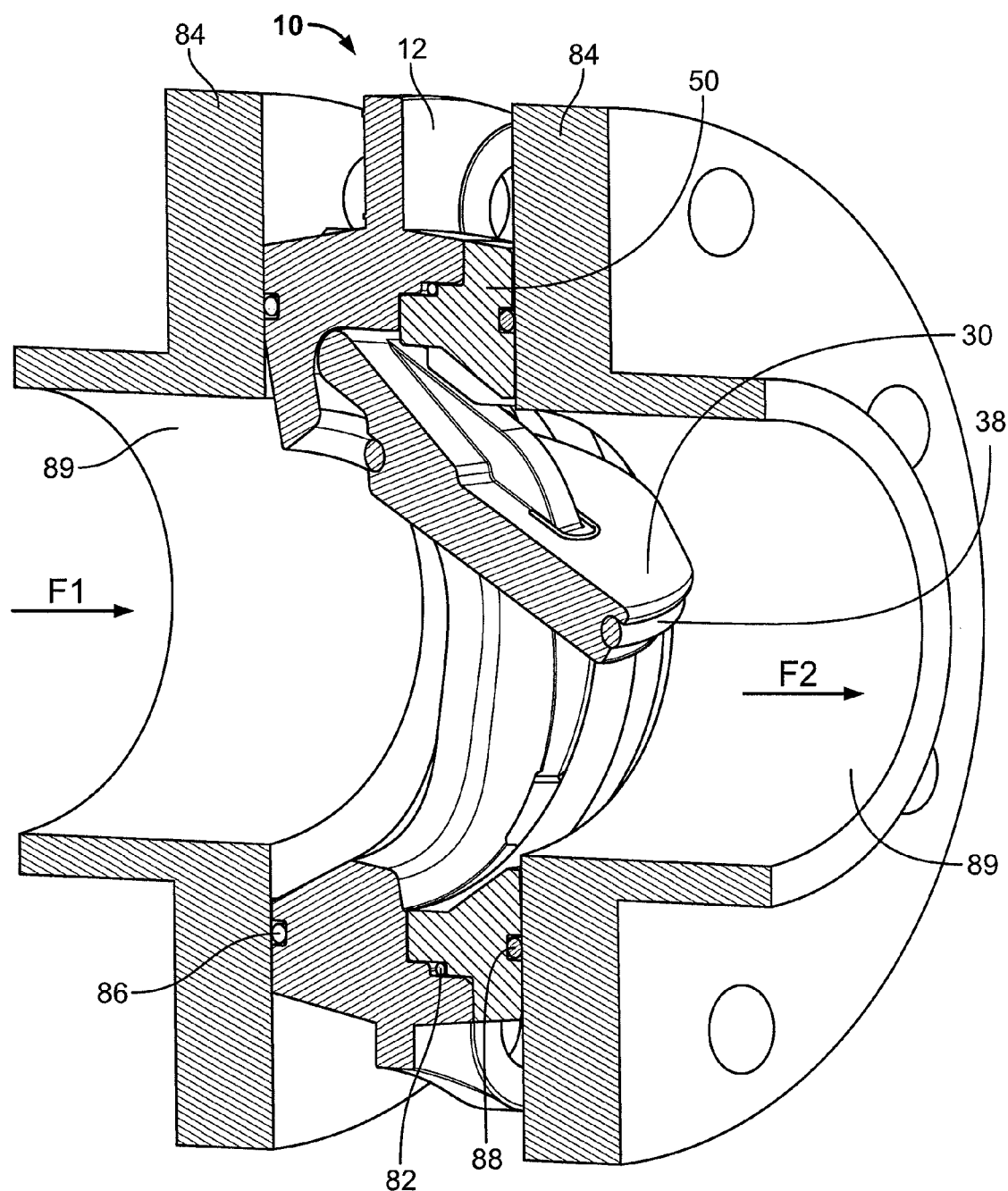
FIG. 6 is another cross-sectional side perspective view of the wafer check valve assembly of FIG. 5.
Figure 7:
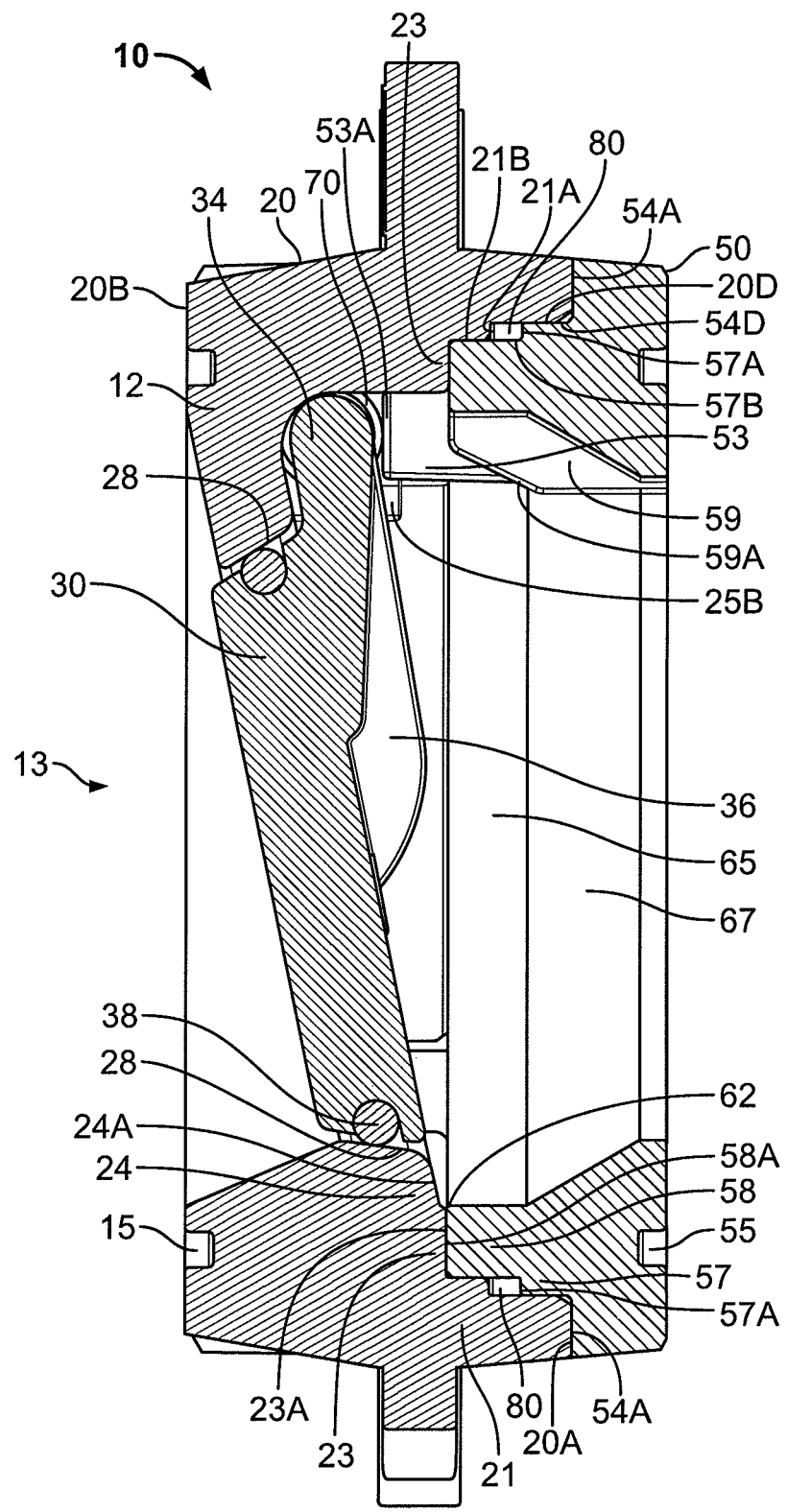
FIG. 7 is a cross-sectional side view of the wafer check valve assembly of FIG. 1.
Figure 20:
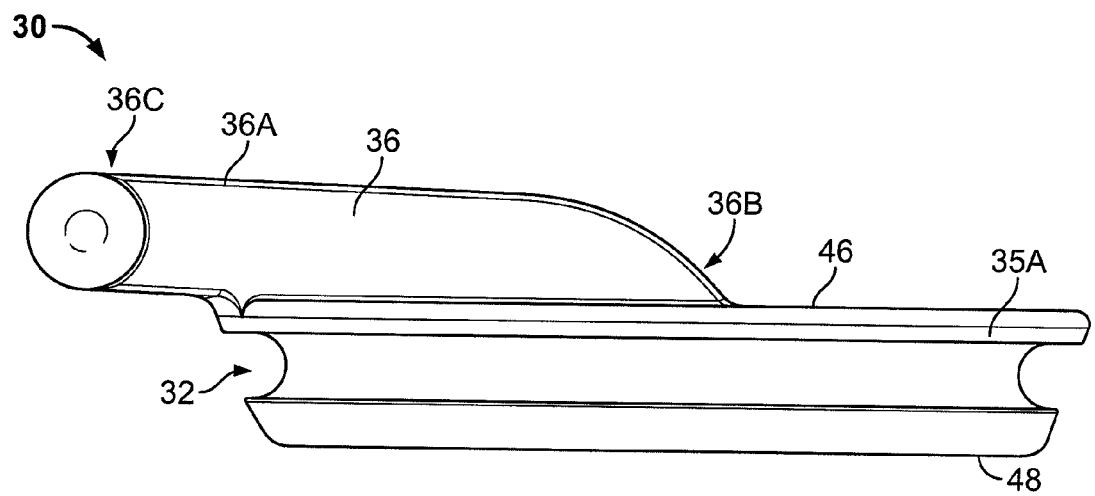
FIG. 20 is a side view of an exemplary disc member for a wafer check valve assembly in accordance with an exemplary embodiment of the present disclosure.

Assembly 10 typically also includes a first gasketing material (e.g., O-ring) 82 positioned within formed mating pocket or notch 80 that is utilized as the primary body member 12/retainer member 50 seal, and a second gasketing material (e.g., O-ring) 38 positioned within disc member groove 32 that is utilized as the primary disc member 30 seal (e.g., the main seal of valve assembly 10) (see, e.g., FIGS. 5, 7 and 20). In general, assembly 10 also includes a third gasketing material 86 positioned within body member groove 15 and a fourth gasketing material 88 positioned within retainer member groove 55 (FIGS. 5 and 7). In exemplary embodiments, the gasketing materials 86, 88 typically are utilized as seals (e.g., face seals) for sealing the assembly 10 (e.g., for sealing body member 12 and retainer member 50) against mating flanges 84 when the assembly 10 is installed between flanges 84 in an exemplary piping system 89 or the like (FIGS. 5-6), as further described below.

In exemplary embodiments and as discussed in further detail below, wafer check valve assembly 10 is assembled by first positioning/housing at least a portion of the second gasketing material 38 within at least a portion of disc member groove 32. Groove 32 typically extends around and/or proximal to the perimeter of disc member 30 (FIGS. 20-21, 23-24). Disc member 30 typically also includes a shaft member 34 (e.g., integral shaft member) that extends from a first end 34A to a second end 34B.

Figure 13:
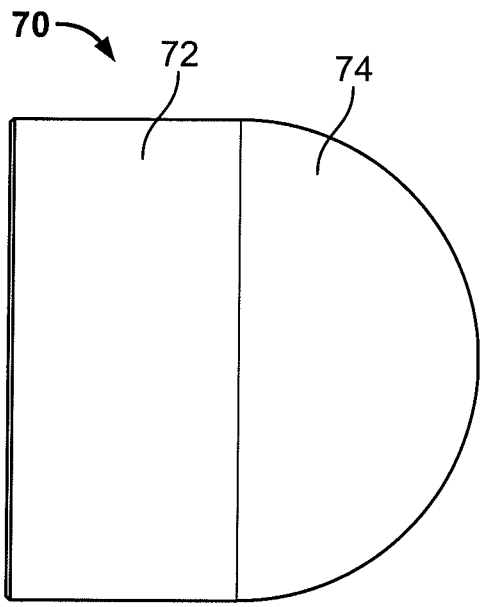
FIG. 13 is a side view of an exemplary cap member for a wafer check valve assembly in accordance with an exemplary embodiment of the present disclosure.
Figure 14:
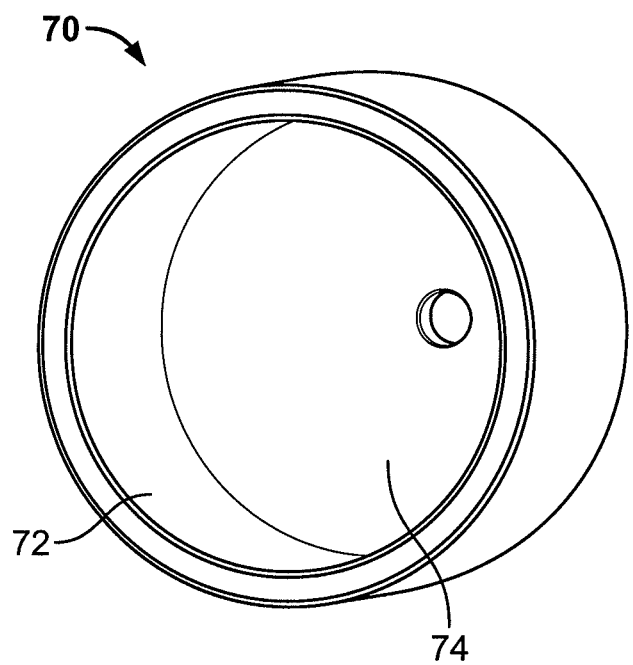
FIG. 14 is a rear perspective view of the cap member of FIG. 13.
Figure 19:
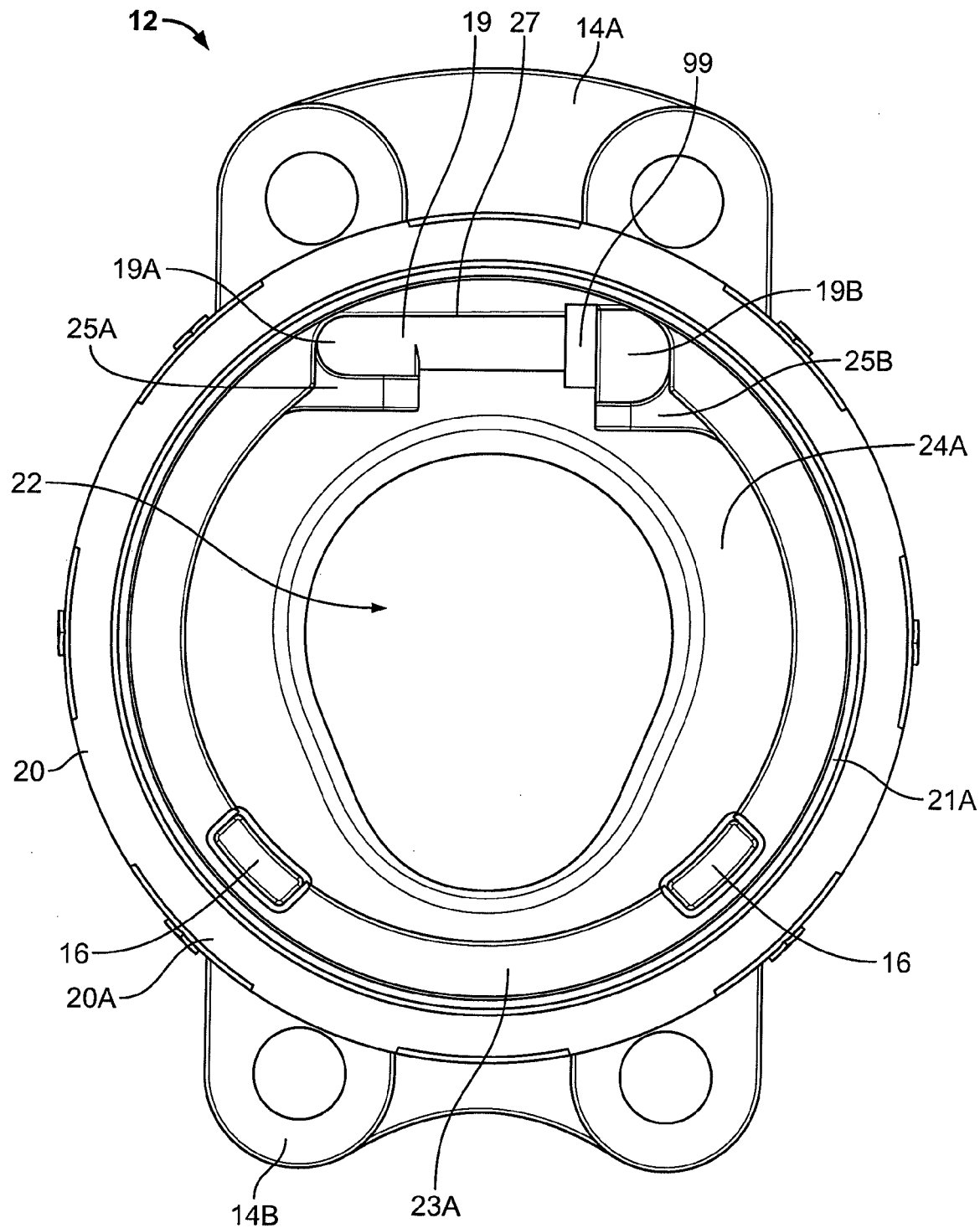
FIG. 19 is a rear view of the body member of FIG. 15.

Next, a cap member 70 (e.g., spring retaining cap member) or the like typically would be mounted with respect to (e.g., positioned on and/or around) second end 34B (FIGS. 13-14). At least a portion of shaft member 34 would then be positioned within a mating groove or pocket 19 of body member 12 (FIG. 19). Next, the body portion 35 of the disc member 30 would be positioned/located within the port opening 22 of the body member 12 (see, e.g., FIGS. 1-4, 19 and 22).

The first gasketing material 82 would then be positioned around/over protrusion 58 of retainer member 50. The mating side 61 of the retainer member 50 would then be mated/engaged with the mating side 26 of the body member 12, while positioning at least a portion of at least one alignment boss 52 of the retainer member 50 within at least a portion of at least one pocket or recess 16 of body member 12, thereby ensuring proper alignment (e.g., rotational alignment) of the engaged retainer member 50 and body member 12 (FIGS. 1-7, 17, 19, 26, 27 and 30). As further described below, retainer member 50 typically includes two alignment bosses 52, and body member 12 typically includes two pockets or recesses 16, although the present disclosure is not limited thereto.

In exemplary embodiments, the retainer member 50 would be engaged/mated with the body member 12 until at least a portion of the mating surface 54A of retainer member 50 engaged, contacted and/or was positioned proximal to the mating surface 20A of body member 12, and/or until at least a portion of the mating surface 58A of retainer member 50 engaged, contacted and/or was positioned proximal to the mating surface 23A of body member 12 (FIGS. 7, 17, 19, 27 and 30). In exemplary embodiments, mating surfaces 54A, 20A, 58A and 23A are substantially planar, although the present disclosure is not limited thereto.

Such positioning of retainer member 50 relative to body member 12 thereby forms mating pocket or notch 80 that is utilized as the primary body member 12/retainer member 50 seal via first gasketing material 82 positioned within formed mating pocket/notch 80 (FIGS. 5 and 7). In exemplary embodiments and as further discussed below, when body member 12 and retainer member 50 are mated/engaged together, mating pocket/notch 80 is formed or defined by at least a portion of: (i) first intermediate surface 21A of body member 12, (ii) inner surface 20D of mating surface 20A of body member 12, (iii) first intermediate surface 57A of retainer member 50, and (iv) inner extending surface 57B of retainer member 50 (see, e.g, FIGS. 7-8).

Figure 7A:
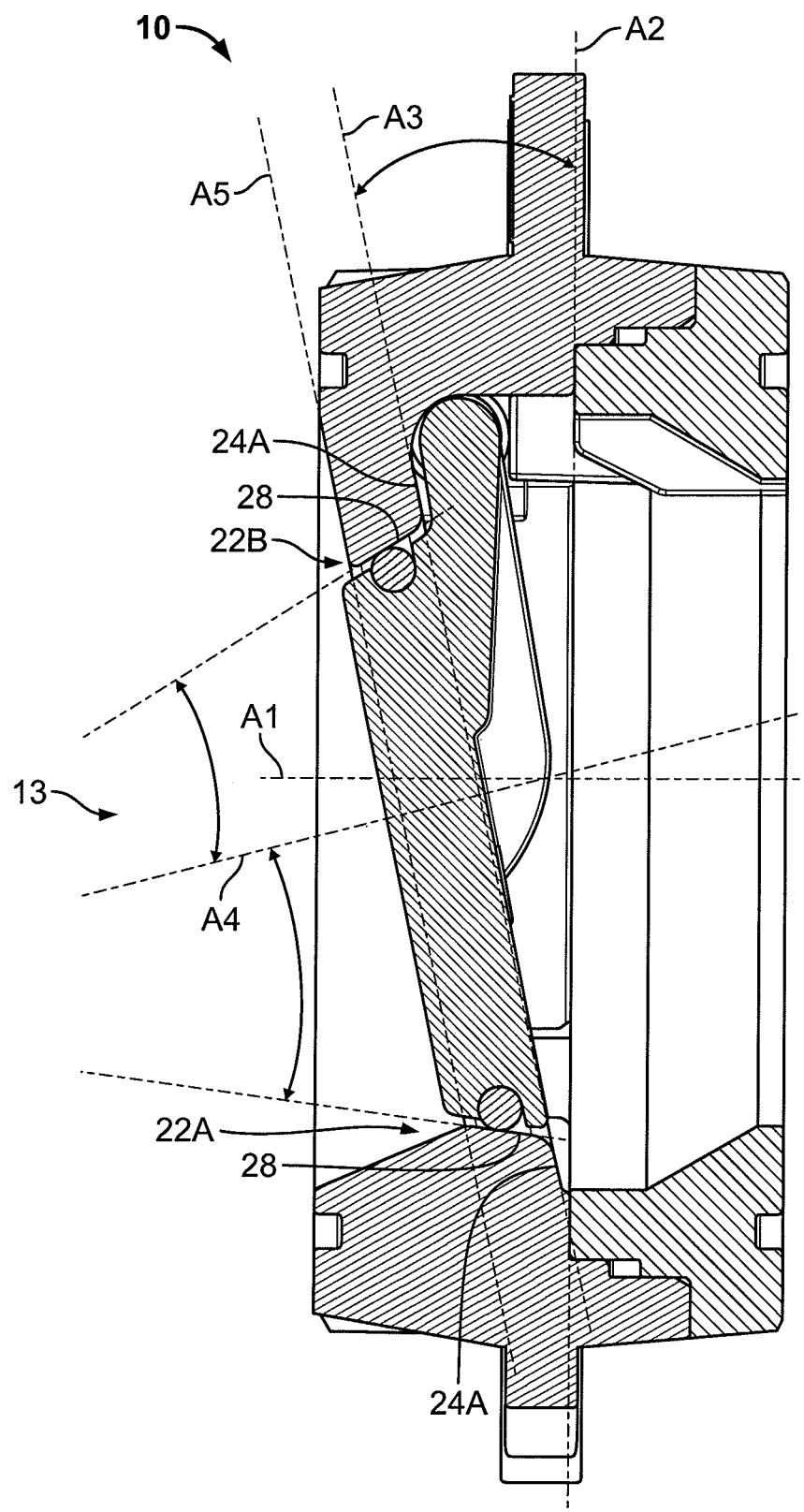
FIG. 7A is another cross-sectional side view of the wafer check valve assembly of FIG. 1.
Figure 26:
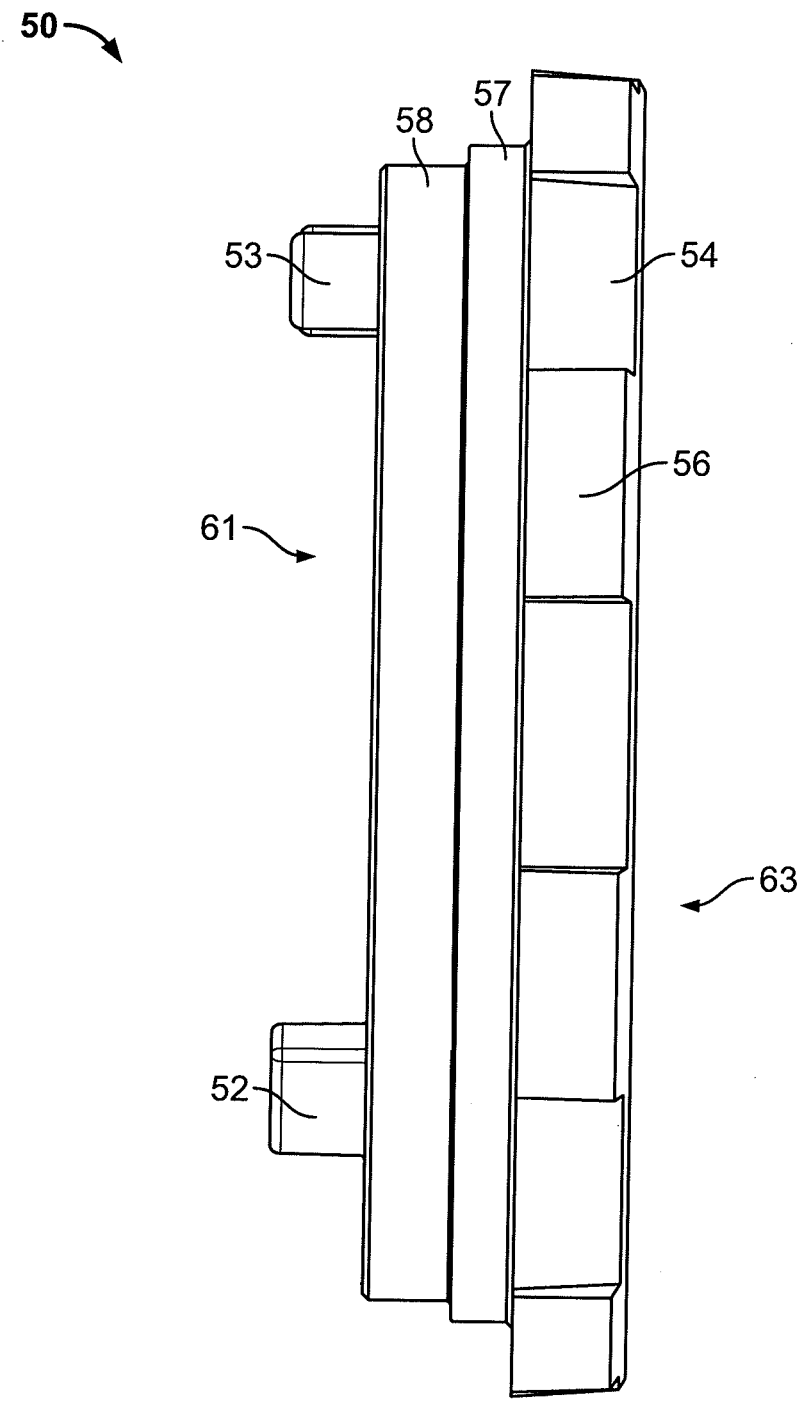
FIG. 26 is a side view of an exemplary retainer member for a wafer check valve assembly in accordance with an exemplary embodiment of the present disclosure.
Figure 27:
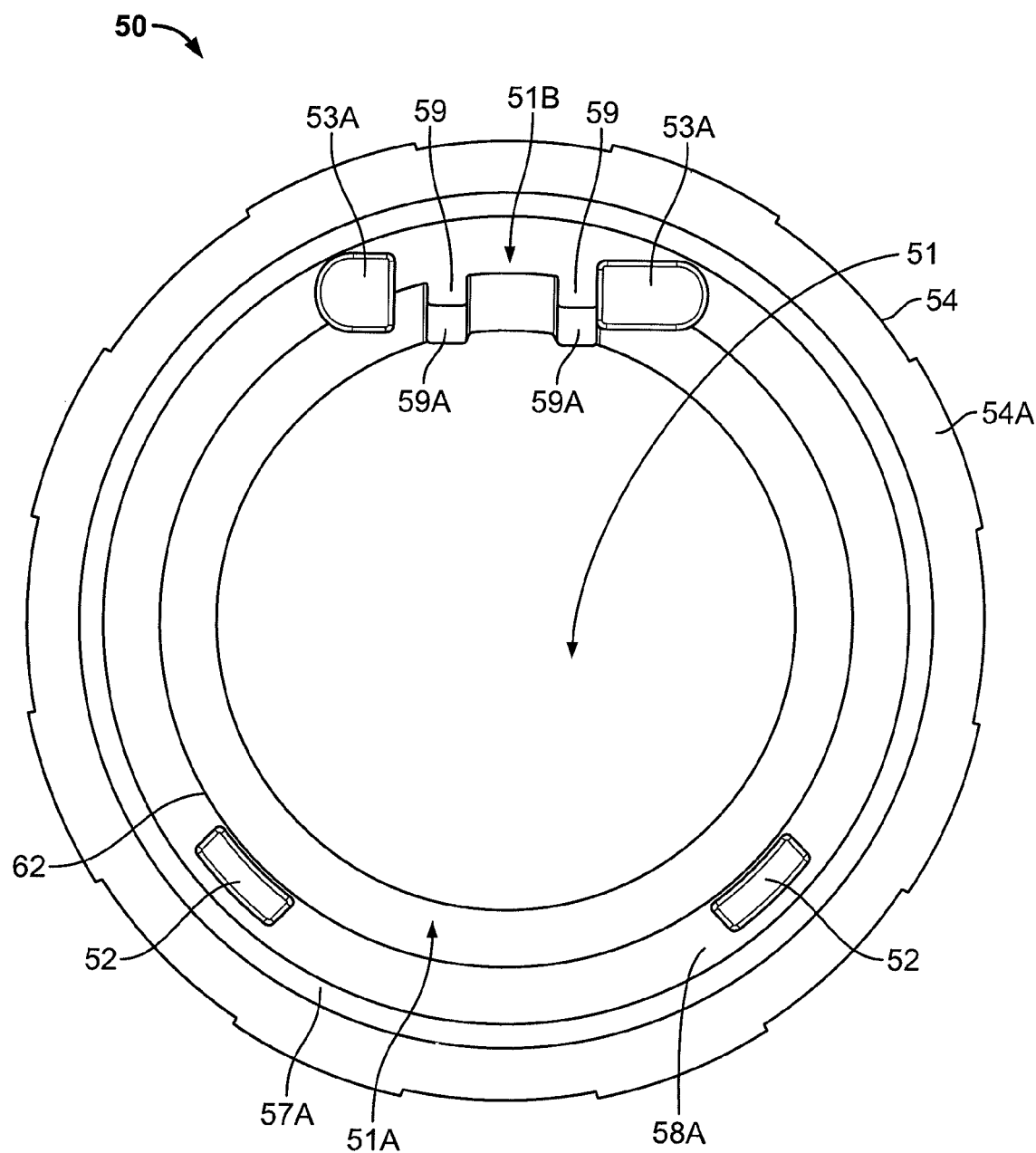
FIG. 27 is a rear view of the retainer member of FIG. 26.

In this state/position, at least one protruding or extending column 53 of retainer member 50 is positioned proximal to the shaft member 34 of the disc member 30 housed within groove 19 to allow rotation of the disc member 30, while substantially preventing translation of the disc member parallel to the main center axis A1 of assembly 10 (FIGS. 7 and 7A). In exemplary embodiments, retainer member 50 includes two extending columns 53 positioned near the upper end of retainer member 50 (FIG. 26).

The wafer check valve assembly 10 is now fully assembled and the rotatable disc member 30 is restrained and/or contained/housed within engaged retainer member 50/body member 12 without the use of conventional fasteners, and while utilizing the first gasketing material 82 positioned within formed mating pocket/notch 80 as the primary body member 12/retainer member 50 seal (although the absence of conventional fasteners is not required). Assembled wafer check valve assembly 10 may then be utilized in fluid systems as a flow control assembly. For example, assembled wafer check valve assembly 10 may be mounted with respect to flanges 84 in an exemplary piping system 89 or the like via apertures 14 of body member 12 (FIGS. 5-6).

In certain embodiments and as shown in FIGS. 16-19, exemplary body member 12 takes the form of a substantially externally cylindrical body member, although the present disclosure is not limited thereto. Rather, body member 12 may take a variety of forms. In general, body member 12 is fabricated from plastic (e.g., thermoplastic).

In general, body member 12 includes an outer or perimeter surface 20. In exemplary embodiments, outer surface 20 substantially defines the outer perimeter/circumference (e.g., substantially cylindrical or annular outer perimeter/circumference) of body member 12. In certain embodiments, the center of outer surface 20 defines a first axis A1 (e.g., central axis A1), as discussed further below in connection with FIG. 7A.

Outer surface 20 typically includes a plurality of extended or raised portions 11 that are positioned around (e.g., equidistantly from one another) and extend from outer surface 20. In general, each raised portion 11 is configured to substantially align with a raised portion 56 of retainer member 50 when the body member 12 and the retainer member 50 are mated/engaged together, as discussed further below. Such substantial alignment of raised portions 11, 56 facilitates proper engagement of body member 12 with retainer member 50.

In general and as noted above, body member 12 includes a mating side 26 that is configured and dimensioned to mate/engage with retainer member 50. Body member 12 also typically includes an inlet side 13 and a port opening 22. Body member 12 generally is the primary structural component of the assembly 10.

Inlet side 13 typically includes groove 15. Groove 15 (e.g., annular groove 15) typically extends around the inlet side 13 of body member 12, and is typically positioned on/within the inlet side mating surface 20B between the port opening 22 and the outer surface 20 of body member 12. In exemplary embodiments, inlet side mating surface 20B is substantially planar and extends from outer surface 20 (e.g., inward toward the center of body member 12), although the present disclosure is not limited thereto. In certain embodiments, mating surface 20B extends around or proximal to the outer perimeter of inlet side 13 and defines a substantially round, cylindrical or annular mating surface 20B.

In exemplary embodiments, groove 15 is configured and dimensioned to house and/or contain at least a portion of gasketing material 86. As noted above, housed gasketing material (e.g., O-ring) 86 is configured to form a seal (e.g., face seal) for sealing the assembly 10 (e.g., for sealing inlet side mating surface 20B of body member 12) against mating flange 84 when the assembly 10 is mounted with respect to exemplary piping system 89 or the like (e.g., via apertures 14 of body member 12) (FIGS. 5, 6, 9, 12, 17 and 18). In exemplary embodiments, body member 12 includes four apertures 14 that are defined by aperture extensions 14A and 14B that extend from body member 12 (e.g., extend from outer surface 20). It is noted that body member 12 may be fabricated/constructed with or without apertures 14.

Figure 16:
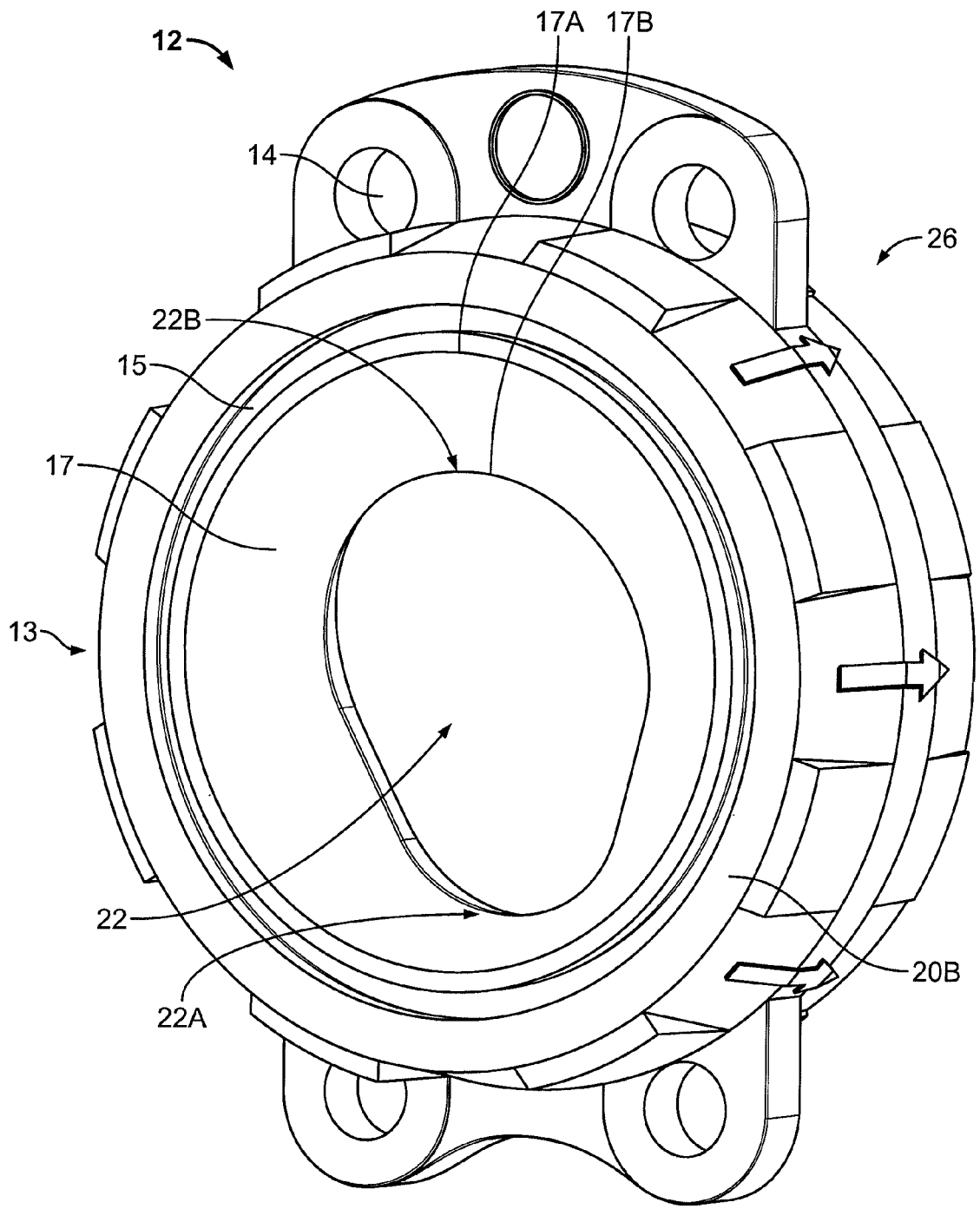
FIG. 16 is a front perspective view of the body member of FIG. 15.

In general, the inlet side 13 includes a flow transition area 17. Flow transition area 17 typically extends and/or tapers/curves from an outer edge 17A proximal to mating surface 20B to an inner edge 17B proximal to port opening 22 (FIG. 16). Inner edge 17B of flow transition area 17 typically defines port opening 22 on inlet side 13. As described in further detail below in connection with FIG. 7A, the fifth axis A5 defined by inner edge 17B of the transition area 17 typically tapers/angles toward mating side 26 from a second end 22B of port opening 22 to a first end 22A of port opening 22 (FIG. 16).

In exemplary embodiments, flow transition area 17 is configured and dimensioned to transition, streamline and/or divert fluid flow F1 (FIG. 6) from an exemplary piping system 89 or the like (e.g., from a round pipe sectional area) into and/or through the port opening 22 of body member 12. In certain embodiments, port opening 22 is substantially oval shaped, substantially egg shaped and/or substantially teardrop shaped, although the present disclosure is not limited thereto.

Applicants have found that the substantially oval/egg/tear-drop shaped port opening 22 advantageously allows an increase in flow area, which results in less resistance to flow (e.g., F1) through assembly 10. Stated another way, the use of a substantially oval/egg/tear-drop shaped port opening 22 allows for greater flow area as well as a non-centric flow area, resulting in increased flow and less restriction to flow through assembly 10. As noted above, restrictive flow is one of the major downsides of conventional wafer check valves. The substantially oval/egg/tear-drop shaped port opening 22 also allows for an advantageous disc member 30 shape/geometry, that in turn, allows a greater degree of disc member 30 opening substantially without the risk of the disc member 30 contacting/engaging the inside edge of the downstream flange (F2) flange 84 or pipe. It is noted that some conventional designs/valves utilize round disc members which come into contact with the inside edge of the downstream flange or pipe, thereby restricting their degree of opening and further increasing the resistance to flow above that already caused by having a greatly reduced port size. Moreover, the advantageously shaped port opening 22 of assembly allows assembly 10 to be utilized without installing/assembling spacers or the like.

As shown in FIGS. 7, 7A, 16 and 28, the center of outer surface 20 of body member 12 and/or the center of opening 51 of retainer member 50 (and/or the center of port opening 22) defines a first axis A1 (e.g., central axis A1). Second axis A2 (FIG. 7A) is typically defined by and extends through the engagement/mating of surfaces 58A and 23A of engaged/mated retainer member 50 and body member 12, respectively. In exemplary embodiments, second axis A2 is positioned substantially transverse (i.e., perpendicular) to axis A1, although the present disclosure is not limited thereto.

Figure 17:
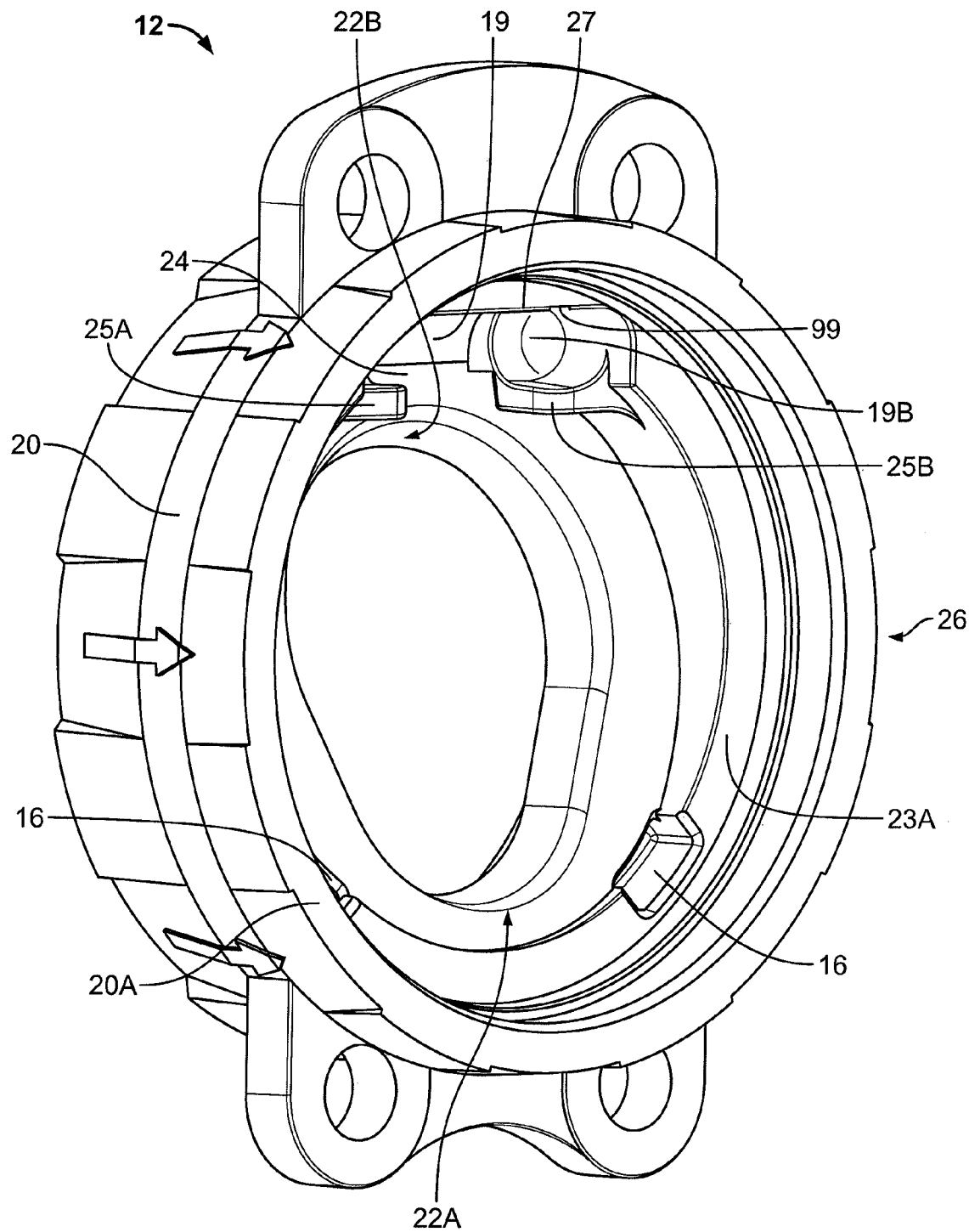
FIG. 17 is a rear perspective view of the body member of FIG. 15.
Figure 18:
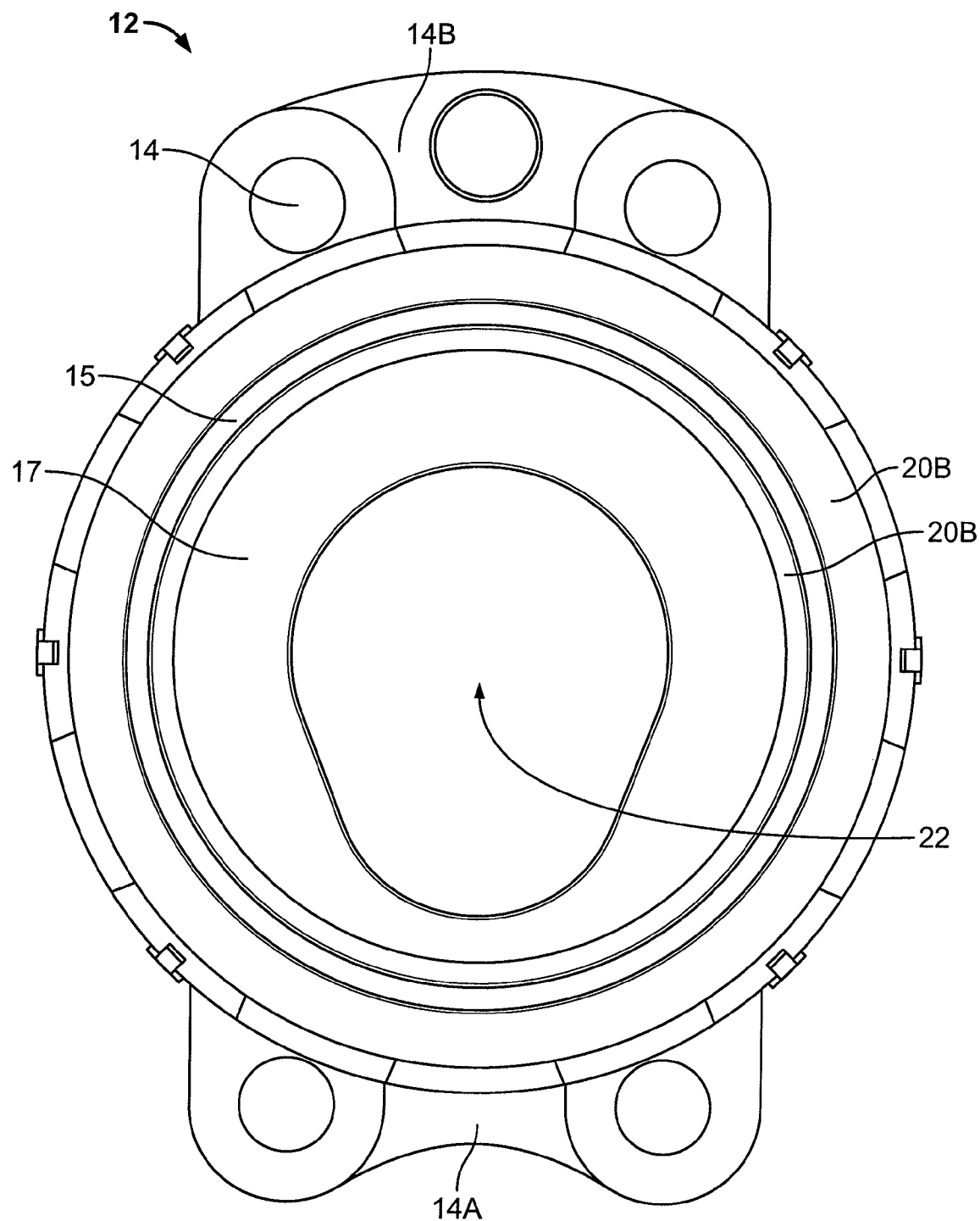
FIG. 18 is a front view of the body member of FIG. 15.

As shown in FIGS. 7, 7A and 17, a surface 24A of the third shoulder 24 of body member 12 defines a third axis A3, the third axis A3 typically angled relative to axis A2. In exemplary embodiments, surface 24A of the third shoulder 24 tapers/angles toward inlet side 13 from a first end 22A of port opening 22 to a second end 22B of port opening 22 (FIG. 17). In general, the angle of taper (e.g., the angle of third axis A3 relative to second axis A2) is about 1° to about 45° or more. In one embodiment, the angle of taper is about 12°. In exemplary embodiments and as shown in FIG. 7A, when the disc member 30 is in the closed position, the third axis A3 extends along or proximal to the top surface 46 of the body portion 35 of the disc member 30.

As noted, surface 24A of the third shoulder 24 typically tapers/angles toward inlet side 13 from a first end 22A of port opening 22 to a second end 22B of port opening 22. In this regard, the portion of surface 24A proximal to the second end 22B extends and/or is positioned further away from (e.g., a longer distance from) the second axis A2 (e.g., extends further toward the inlet side 13) compared to the portion of surface 24A proximal to the first end 22A. As such, first end 22A of port opening 22 on the mating side 26 is positioned closer or a shorter distance to second axis A2 (e.g., closer to the outlet side 63) than second end 22B of port opening 22 on the mating side 26.

Fourth axis A4 extends transverse relative to third axis A3. Seating/sealing surface 28 of body member 12 defines the disc member seating/sealing area. In exemplary embodiments, seating/sealing surface 28 angles/tapers and/or extends from shoulder 24 inwardly toward the center of port 22. For example, seating/sealing surface 28 angles/tapers inwardly toward the center of port 22 at an angle of about 12° to about 60° or more relative to fourth axis A4. In one embodiment, the angle/taper of seating/sealing surface 28 is about 20° inwardly toward the center of port 22 relative to fourth axis A4. In exemplary embodiments and as shown in FIG. 7A, when the disc member 30 is in the closed position, the fourth axis A4 extends substantially through the center of the body portion 35 of the disc member 30.

Returning again to body member 12 (FIGS. 16-19) in connection with FIG. 7A, the inner edge 17B of the transition area 17 defines a fifth axis A5. In exemplary embodiments, fifth axis A5 is substantially parallel to third axis A3. For example, when third axis A3 is angled a certain amount (e.g., 12°) relative to second axis A2, fifth axis A5 is angled substantially the same amount relative to second axis A2 (e.g., about 12°), although the present disclosure is not limited thereto.

In exemplary embodiments, the fifth axis A5 defined by inner edge 17B of the transition area 17 tapers/angles toward mating side 26 from a second end 22B of port opening 22 to a first end 22A of port opening 22 (FIG. 16). In general, the angle of taper (e.g., the angle of fifth axis A5 relative to second axis A2) is about 1° to about 45° or more. In one embodiment, the angle of taper is about 12°. In exemplary embodiments and as shown in FIG. 7A, when the disc member 30 is in the closed position, the fifth axis A5 extends along or proximal to the bottom surface of the body portion 35 of the disc member 30.

As noted, the fifth axis A5 defined by inner edge 17B of the transition area 17 typically tapers/angles toward mating side 26 from a second end 22B of port opening 22 to a first end 22A of port opening 22. In this regard, the portion of inner edge 17B proximal to the first end 22A extends and/or is positioned further toward (e.g., a shorter distance from) the second axis A2 (e.g., extends further toward the outlet side 63) compared to the portion of inner edge 17B proximal to the second end 22B. As such, first end 22A of port opening 22 on the inlet side 13 is positioned closer or a shorter distance to second axis A2 (e.g., closer to the outlet side 63) than second end 22B of port opening 22 on the inlet side 13.

In exemplary embodiments, it has been found that the positioning of: (i) first end 22A of port opening 22 on the inlet side 13 closer or a shorter distance to second axis A2 (e.g., closer to the outlet side 63) than second end 22B of port opening 22 on the inlet side 13, and/or (ii) first end 22A of port opening 22 on the mating side 26 closer or a shorter distance to second axis A2 (e.g., closer to the outlet side 63) than second end 22B of port opening 22 on the mating side 26 advantageously allows assembly 10 (e.g., flow transition area 17) to transition, streamline and/or divert fluid flow F1 (FIG. 6) from an exemplary piping system 89 or the like (e.g., from a round pipe sectional area) into and/or through the port opening 22 of body member 12. Stated another way, such positioning of ends 22A, 22B of port opening 22 advantageously allows an increase in flow area, which results in less resistance to flow (e.g., F1) through assembly 10. Stated another way, the above noted positioning of ends 22A, 22B of port opening 22 and/or flow transition area 17 allows for greater flow area as well as a non-centric flow area, resulting in increased flow and less restriction to flow through assembly 10.

With respect to the mating side 26 of body member 12, a mating side mating surface 20A typically extends (e.g., inward toward the center of body member 12) from outer surface 20. In exemplary embodiments, mating surface 20A is substantially planar. In general, mating surface 20A is configured and dimensioned to mate/engage with and/or abut against retainer member 50. In certain embodiments, mating surface 20A extends around or proximal to the outer perimeter of mating side 26 and defines a substantially round, cylindrical or annular mating surface 20A.

As shown in FIGS. 7, 17 and 19, mating side 26 typically also includes a first shoulder 21. In exemplary embodiments, first shoulder 21 defines a first intermediate surface 21A that extends towards the center of body member 12 from the inner interior end of inner surface 20D of mating surface 20A. In one embodiment, first intermediate surface 21A is substantially planar and extends around and defines a substantially round, cylindrical or annular inner perimeter/surface of mating side 26.

Mating side 26 typically also includes a second shoulder 23 that defines a second intermediate mating surface 23A that extends towards the center of body member 12 from the inner interior end of inner surface 21B of first shoulder 21. In general, mating surface 23A is substantially planar and extends around and defines another substantially round, cylindrical or annular inner perimeter/surface of mating side 26.

In general, mating surface 23A includes at least one pocket, recess or notch 16 (e.g., rectangular notch or the like). In exemplary embodiments, mating surface 23A includes two pockets or recesses 16. In one embodiment, the two pockets 16 are positioned: (i) proximal to first end 22A, and (ii) about 120° apart from one another on mating surface 23A (e.g., at the 4 o'clock and the 8 o'clock positions when viewing FIG. 19). Each pocket 16 is typically configured and dimensioned to allow (e.g., mate/engage with) at least a portion of at least one alignment boss 52 of the retainer member 50 to be positioned within at least a portion of each pocket 16 to facilitate proper alignment (e.g., rotational alignment) of the engaged retainer member 50 and body member 12, as further discussed above/below. In general, each mated/engaged pocket 16 and alignment boss 52 facilitate proper orientation of the retainer member 50 relative to the body member 12 during the assembly process, and also substantially prevent the rotation of the retainer member 50 relative to the body member 12.

Mating surface 23A also typically includes mating groove 19. As noted above/below, at least a portion of shaft member 34 of disc member 30 is configured to be positioned within at least a portion of mating groove/pocket 19 of mating surface 23A. In exemplary embodiments, groove 19 is a substantially semi-cylindrical groove that extends across at least a portion of mating surface 23A proximal to second end 22B. In one embodiment, the upper surface/wall 27 of groove 19 is formed/defined by mating surface 23A, and the lower portion of groove 19 includes partial wall segments 25A and 25B that extend from third shoulder 24, the partial wall segments 25A, 25B having a break (e.g., a non-walled section) positioned therebetween (FIG. 19). As such, the upper wall 27 and the wall segments 25A, 25B form an approximately or substantially semi-cylindrical groove 19 into which at least a portion of shaft member 34 of disc member 30 is configured to be placed/positioned/housed during assembly of wafer check valve assembly 10.

In exemplary embodiments, the engagement of the at least one column 53 of retainer member 50 with the disc shaft 34 housed within groove 19 provides that the disc shaft 34 is fully contained/housed within groove 19. Moreover, while the clearances of groove 19 and/or column 19 are sufficient to allow rotation of disc shaft 34, it is noted that the translation of the disc shaft 34 in the lateral and axial directions is substantially prevented/restricted by the groove 19, upper wall 27, wall segments 25A, 25B and/or engaged column 53.

In exemplary embodiments and as shown in FIG. 19, groove 19 extends from a first end 19A to a second end 19B. In one embodiment, first end 19A defines a substantially quarter-spherical end, and second end 19B defines a substantially quarter-spherical end that is larger (e.g., slightly larger in dimension and/or diameter) than first end 19A. However, it is noted that first and second ends 19A, 19B may be substantially the same size/shape/dimensions.

With respect to smaller first end 19A, it is noted that exemplary smaller first end 19A substantially prevents improper installation/assembly of disc member 30 (e.g., shaft member 34) with respect to groove 19. In general, at least a portion of groove 19 forms/defines a spring groove 99. In exemplary embodiments, spring groove 99 is formed/defined by and/or is integral with at least a portion of larger second end 19B. In general, spring groove 99 is advantageously configured and dimensioned to accommodate the addition of a spring member 90 or the like to assembly 10 when/if desired, as discussed further below.

For example, spring member 90 may be mounted to disc shaft 34 and thereby prevented from slipping off the disc shaft 34 (e.g., due to movement along shaft 34) by a cap member 70 that is mounted with respect to end 34B of disc shaft 34 (FIG. 32), as discussed in further detail below. As the cap member 70 is typically larger in diameter than the disc shaft 34, the larger second end 19B of the groove 19 is thereby configured and dimensioned to accommodate cap member 70 that is mounted with respect to end 34B of disc shaft 34 (and smaller first end 19A typically is configured to not be able to accommodate cap member 70 that is mounted with respect to disc shaft 34). Moreover, mounted cap member 70 and/or larger second end 19B also facilitates the proper orientation of the disc member 30 relative to the body member 12 during the assembly process (e.g., disc member 30 cannot be installed backward, upside down, etc.). For example, disc member 30 with cap member 70 mounted thereon provides/ensures that a user will insert/house the end of the disc member 30 having the cap member 70 in the larger second end 19B, thereby facilitating the proper orientation of the disc member 30 relative to the body member 12 during the assembly process. In alternative embodiments and as discussed further below, cap member 70 or the like may be integral with an end (e.g., end 34B) of disc shaft 34 to thereby facilitate proper orientation of the disc member 30 relative to the body member 12 during the assembly process. Moreover, it is noted that first end 19A may be larger than second end 19B.

In exemplary embodiments and as discussed further below, shaft member 34 may be asymmetrical in that the length from the center of the shaft member 34 to the first end 34A is longer than the length from the center of the shaft member 34 to the second end 34B, which also substantially prevents improper installation/assembly of disc member 30 (e.g., shaft member 34) with respect to groove 19. For example, the length from the center of the groove 19 to the first end 19A may be longer than the length from the center of the groove 19 to the second end 19B. Alternatively, ends 19A, 19B may extend substantially the same length from the center of groove 19, and once a cap member 70 is mounted with respect to second end 34B (FIG. 32), ends 34A, 34B are thereby substantially an equal distance from the center of the disc member 30, with mounted cap member 70 and larger second end 19B also facilitating the proper orientation of the disc member 30 relative to the body member 12, as discussed above.

In certain embodiments and as shown in FIGS. 26-30, exemplary retainer member 50 takes the form of a substantially externally cylindrical retainer member, although the present disclosure is not limited thereto. Rather, retainer member 50 may take a variety of forms. In general, retainer member 50 can be fabricated from plastic (e.g., thermoplastic).

In general, retainer member 50 includes an outer or perimeter portion/surface 54. In exemplary embodiments, outer surface/portion 54 (e.g., flange portion 54) substantially defines the outer perimeter/circumference (e.g., substantially cylindrical or annular outer perimeter) of retainer member 50.

In exemplary embodiments, the outer perimeter/circumference defined by outer surface 54 is substantially equal to the outer perimeter/circumference defined by the outer surface 20 of body member 12 (e.g., when body member 12 and retainer member 50 are engaged/mated together). In certain embodiments, the center of outer surface 54 defines first axis A1 (e.g., central axis A1), as discussed above in connection with FIG. 7A.

Figure 15:
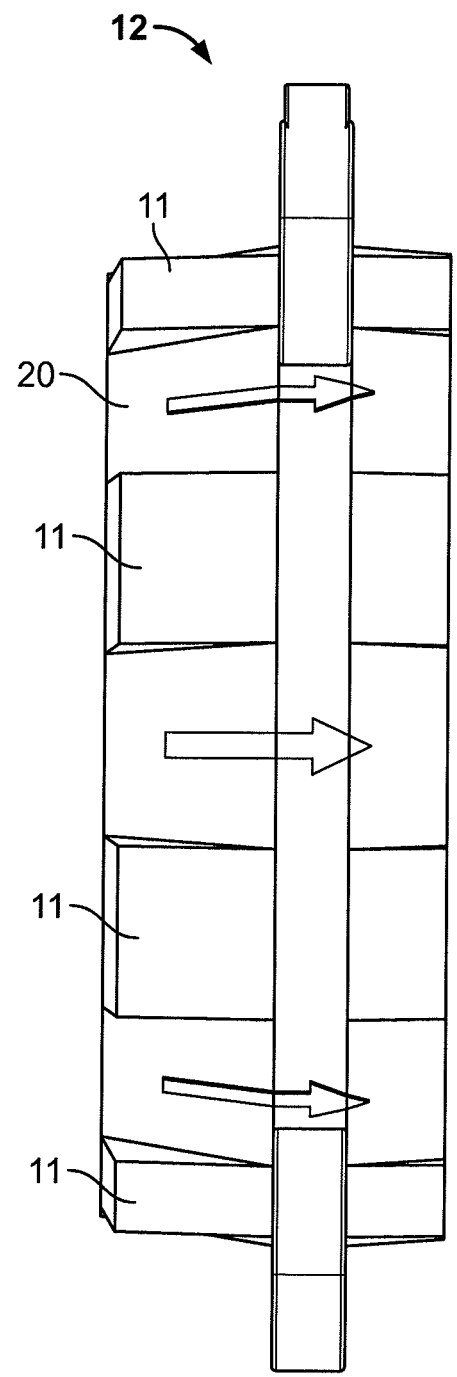
FIG. 15 is a side view of an exemplary body member for a wafer check valve assembly in accordance with an exemplary embodiment of the present disclosure.

Outer surface 54 typically includes a plurality of extended or raised portions 56 that are positioned around (e.g., equidistantly from one another) and extend from outer surface 54. In general, each raised portion 56 is configured to substantially align with a raised portion 11 of body member 12 when the body member 12 and the retainer member 50 are mated/engaged together. Such substantial alignment of raised portions 11 to 56 facilitates proper engagement of body member 12 with retainer member 50, and also facilitates users to grip or grasp assembled wafer check valve assembly 10 (see, e.g., FIGS. 15 and 26).

In general, retainer member 50 includes a mating side 61 that is configured and dimensioned to mate/engage with body member 12. Retainer member 50 also typically includes an outlet side 63 and a flow opening or bore 51. Exemplary flow opening 51 takes the form of a substantially cylindrical or round flow opening 51, although the present disclosure is not limited thereto. Rather, flow opening 51 may take a variety of forms/geometries. In certain embodiments, the center of flow opening 51 cooperates to define the first axis A1 (e.g., central axis A1), as discussed above in connection with FIG. 7A.

In general, outlet side 63 includes mating surface 54B. In exemplary embodiments, outlet side mating surface 54B is substantially planar and extends inward (e.g., inward toward the center of retainer member 50) from an outer edge 54C proximal to outer surface 54 to an inner edge 54D proximal to flow opening 51. In certain embodiments, mating surface 54B extends around or proximal to the outer perimeter of outlet side 63 and defines a substantially round, cylindrical or annular mating surface 54B. Inner edge 54D of mating surface 54B typically defines the outlet side 63 of flow opening 51.

Outlet side 63 typically includes groove 55. Groove 55 (e.g., annular groove 55) typically extends around the outlet side 63 of retainer member 50, and is typically positioned on/within the outlet side mating surface 54B between the flow opening 51 and the outer surface 54 of retainer member 50. In one embodiment, groove 55 is positioned on/within mating surface 54B at a position that is substantially half-way between the outer edge 54C and the inner edge 54D of mating surface 54B.

In exemplary embodiments, groove 55 is configured and dimensioned to house and/or contain at least a portion of gasketing material 88. As noted above, housed gasketing material (e.g., O-ring) 88 is configured to form a seal (e.g., face seal) for sealing the assembly 10 (e.g., for sealing outlet side mating surface 54B of retainer member 50) against mating flange 84 when the assembly 10 is mounted with respect to exemplary piping system 89 or the like (FIGS. 5-6).

With respect to the mating side 61 of retainer member 50, a mating side mating surface 54A typically extends (e.g., inward toward the center of retainer member 50) from outer surface 54. In exemplary embodiments, mating surface 54A is substantially planar. In general, mating surface 54A is configured and dimensioned to mate/engage with and/or abut against body member 12. In certain embodiments, mating surface 54A extends around or proximal to the outer perimeter of mating side 61 and defines a substantially round, cylindrical or annular mating surface 54A.

As shown in FIGS. 7, 26, 27 and 30, mating side 61 typically also includes a first shoulder or protrusion 57 (e.g., cylindrical protrusion or extending member). In exemplary embodiments, first protrusion 57 defines a first intermediate surface 57A that extends towards the center of retainer member 50 from the inner interior end of inner extending surface 54D of mating surface 54A. In one embodiment, first intermediate surface 57A is substantially planar and extends around and defines a substantially round, cylindrical or annular inner perimeter/surface of mating side 61.

Mating side 61 typically also includes a second shoulder or protrusion 58 (e.g., cylindrical protrusion or extending member). In exemplary embodiments, second protrusion 58 defines a second intermediate mating surface 58A that extends towards the center of retainer member 50 from the inner interior end of inner extending surface 57B of first protrusion 57. In general, mating surface 58A is substantially planar and extends around and defines another substantially round, cylindrical or annular inner perimeter/surface of mating side 61.

In general, mating surface 58A includes at least one alignment boss 52 (e.g., rectangular boss or the like) that extends from mating surface 58A. In exemplary embodiments, mating surface 58A includes two alignment bosses 52.

In one embodiment, the two bosses 52 are positioned: (i) proximal to first end 51A of opening 51, and (ii) about 120° apart from one another on mating surface 58A (e.g., at the 4 o'clock and the 8 o'clock positions when viewing FIG. 27). Each boss 52 is typically configured and dimensioned to be positioned/housed within at least a portion (e.g., mate/engage with) of a pocket 16 of body member 12 to facilitate proper alignment (e.g., rotational alignment) of the engaged retainer member 50 and body member 12, as further discussed above/below. As noted, each mated/engaged pocket 16 and alignment boss 52 facilitate proper orientation of the retainer member 50 relative to the body member 12 during the assembly process, and also substantially prevent the rotation of the retainer member 50 relative to the body member 12.

Mating surface 58A also typically includes at least one column or extending member 53 that extends/protrudes from mating surface 58A. In general, a mating surface 53A of each column member 53 is configured and dimensioned to engage/interact with at least a portion of disc shaft 34 of disc member 30 when: (i) disc shaft 34 is housed/positioned within groove 19 of body member 12, and (ii) retainer member 50 and body member 12 are engaged/mated together.

In exemplary embodiments, mating surface 58A includes two column members 53. In certain embodiments, the mating surface 53A (e.g., planar mating surface) of each column member 53 is substantially rectangular in shape/section, and includes an outer filleted end. In one embodiment, column members 53 are positioned: (i) proximal to second end 51B of opening 51, and (ii) equally spaced apart from one another the same distance relative to the central axis of opening 51.

In exemplary embodiments and as noted above, at least a portion of shaft member 34 of disc member 30 is configured to be positioned within at least a portion of mating groove/pocket 19 of mating surface 23A, and the upper wall 27 and the wall segments 25A, 25B form a substantially semi-cylindrical groove 19 into which at least a portion of shaft member 34 of disc member 30 is configured to be positioned/housed during assembly of wafer check valve assembly 10. As such, the engagement of the at least one mating surface 53A of column 53 with the disc shaft 34 housed within groove 19 provides that the disc shaft 34 is fully contained/housed within groove 19. Additionally, while the clearances of groove 19 and/or column 53 are sufficient to allow rotation of disc shaft 34, it is noted that the translation of the disc shaft 34 in the lateral and axial directions is substantially prevented/restricted by the groove 19, upper wall 27, wall segments 25A, 25B and/or engaged column(s) 53.

Figure 30:
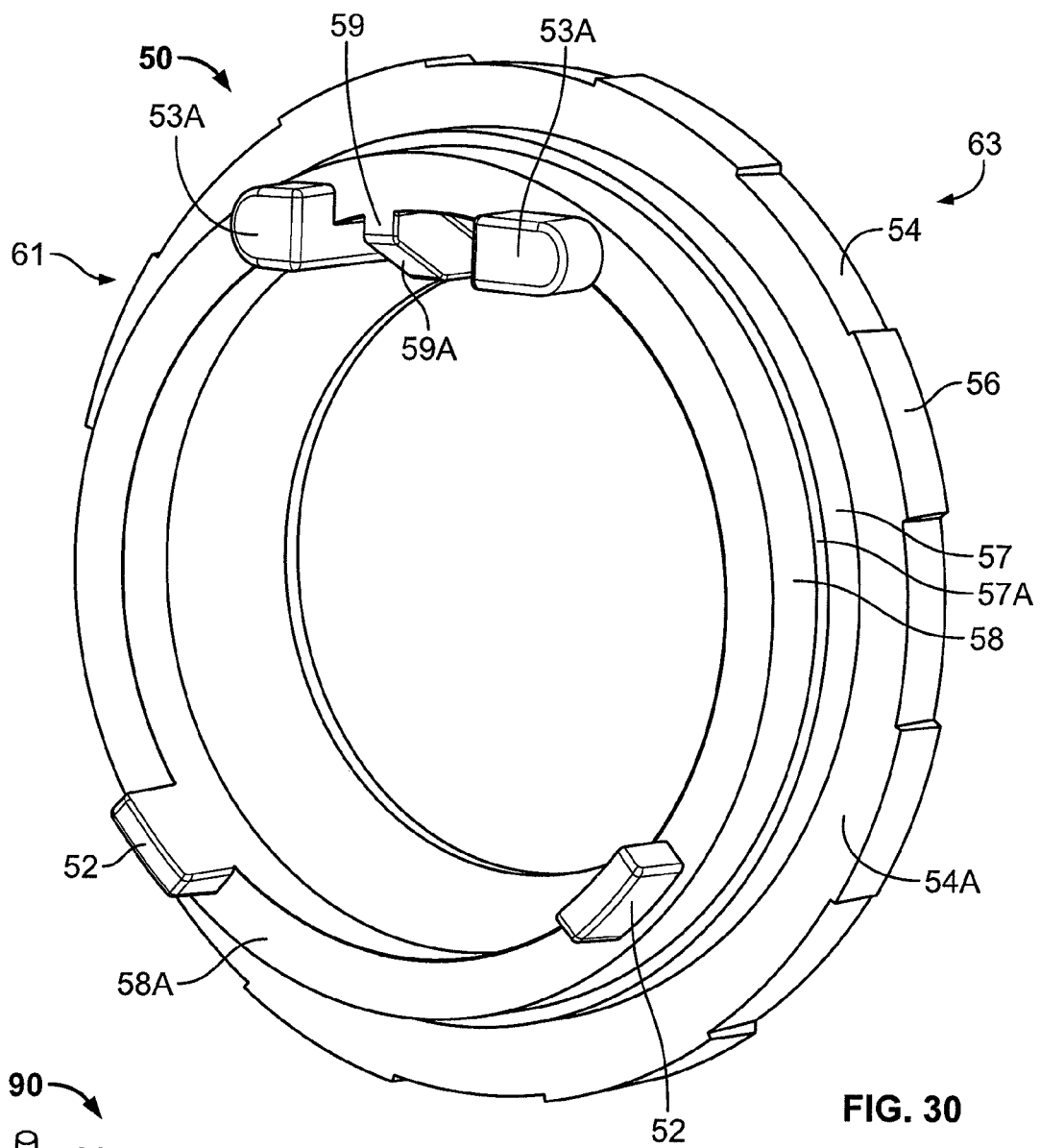
FIG. 30 is a rear perspective view of the retainer member of FIG. 26.

Mating surface 58A also typically includes at least one rib member 59. Rib member 59 generally is positioned between the two column members 53, and extends downwardly from the mating surface 58A toward the center of flow opening 51. Rib member 59 typically also extends toward the outlet side 63 until it is flush with mating surface 54B. In general, rib member 59 is also typically flush with the mating surface 58A (FIG. 30). In exemplary embodiments, mating surface 58A includes two rib members 59 positioned between the two column members 53.

In general, a mating surface 59A (e.g., angled or tapered mating/engagement surface 59A) of each rib member 59 is configured and dimensioned to engage/interact with at least a portion of the top surface 36A (e.g., angled or tapered surface 36A) of rib member 36 of disc member 30 when: (i) disc shaft 34 is housed/positioned within groove 19 of body member 12, (ii) retainer member 50 and body member 12 are engaged/mated together, and (iii) disc member is forced to the open position (see, e.g., FIGS. 4, 6 and 8). Such engagement and/or interaction of surfaces 59A, 36A advantageously limits the travel of the disc member 30 when the disc member is forced to the open position, and also substantially prevents the first end 42 of the disc member 30 from contacting/engaging the inside surface of the adjoining pipe of flange 84 (FIG. 6). Moreover, the advantageous engagement and/or interaction of surfaces 59A, 36A of assembly 10 allows assembly 10 to be utilized without installing/assembling spacers or the like.

In exemplary embodiments, mating surface 58A includes two rib members 59 and disc member 30 includes two rib members 36, and each rib member 59 is configured and dimensioned to engage/interact with at least a portion of the top surface 36A of a rib member 36 of disc member 30 when: (i) disc shaft 34 is housed/positioned within groove 19 of body member 12, (ii) retainer member 50 and body member 12 are engaged/mated together, and (iii) disc member is forced to the open position. However, it is noted that the retainer member 50 can include any number of rib members 59 and disc member 30 can include any number of rib members 36.

Figure 28:
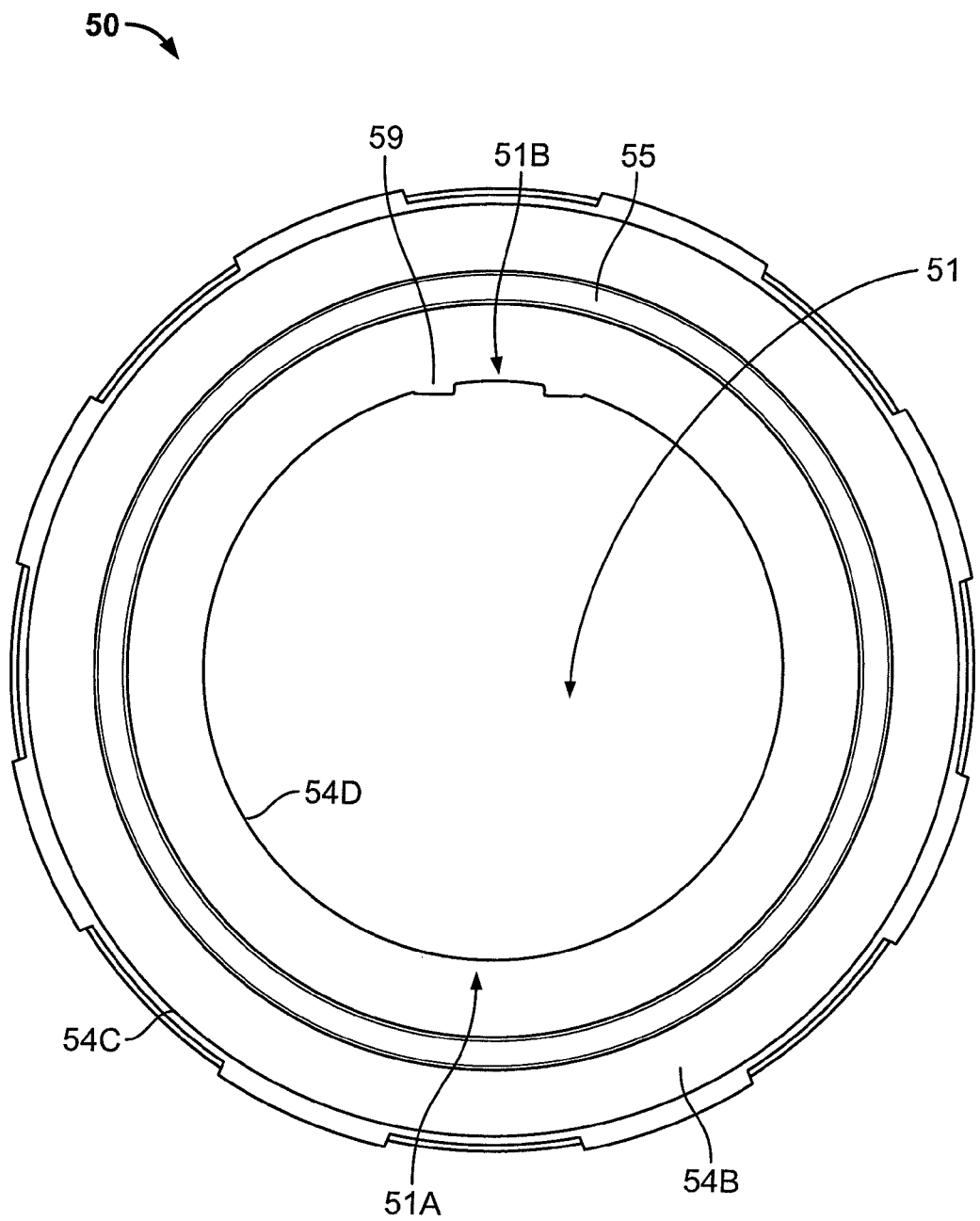
FIG. 28 is a front view of the retainer member of FIG. 26.
Figure 29:
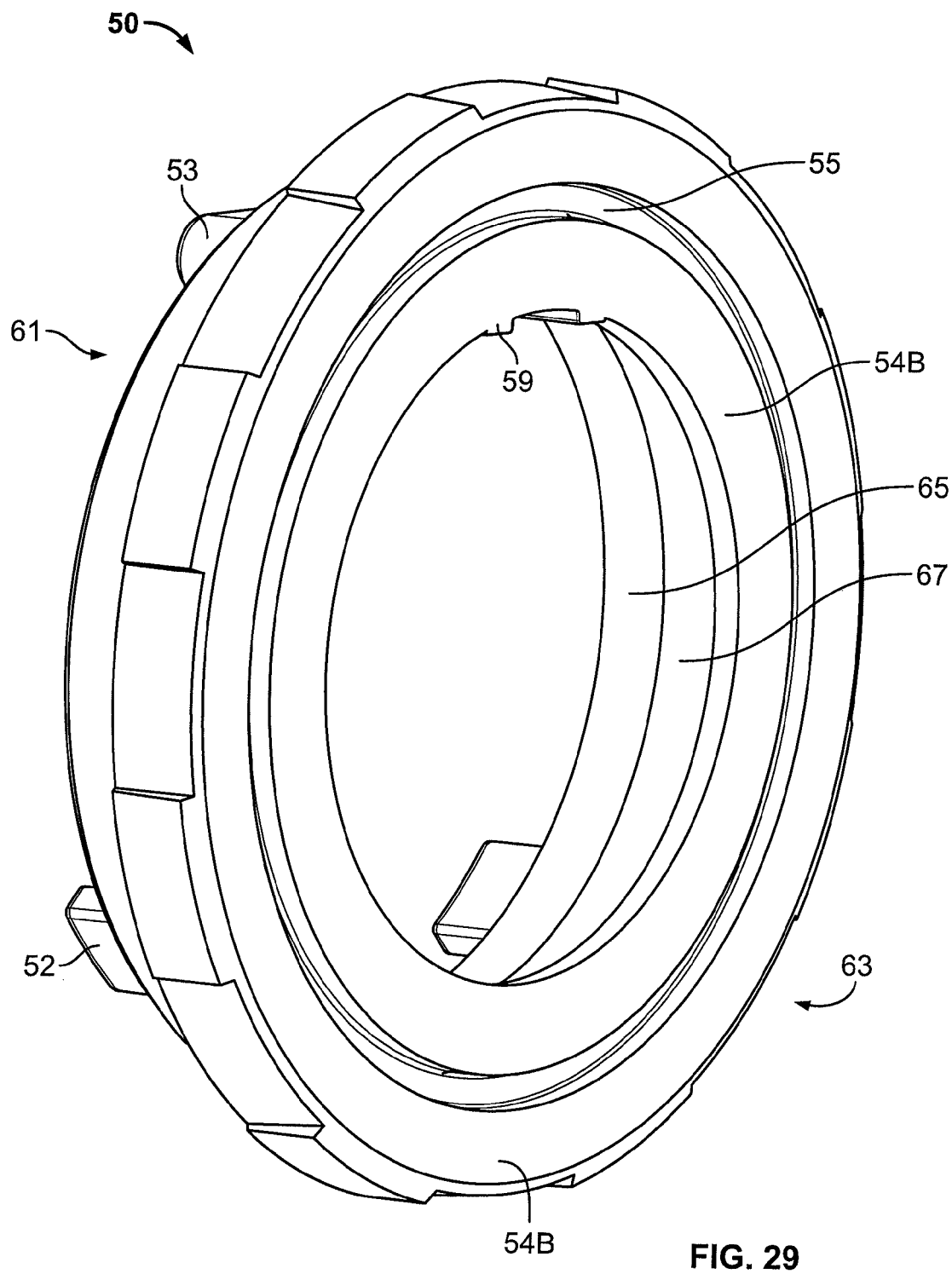
FIG. 29 is a front perspective view of the retainer member of FIG. 26.

In exemplary embodiments, the interior of the flow opening 51 proximal to the mating side 61 includes interior cylindrical portion/section 65. Cylindrical portion 65 typically extends from the inner edge 62 of the mating surface 58A towards the outlet side 63 until it meets and/or is proximal to interior angled or tapered portion/section 67. Angled section 67 typically extends from the cylindrical portion towards the outlet side 63 until it meets and/or is proximal to the inner edge 54D of outlet side mating surface 54B (FIG. 28). In exemplary embodiments, angled section 67 advantageously directs or shapes the fluid flow coming through the port opening 22 (e.g., egg-shaped port opening) of the body member 12 and transitions the port opening 22 of the assembly to a flow opening 51 (e.g., to substantially round flow opening 51), with flow opening 51 substantially matching the inside diameter of the adjoining pipe or flange 84 of piping system 89 (FIG. 5).

In exemplary embodiments and as shown in FIGS. 20-25 and 32, exemplary assembly 10 includes disc member 30. In general, disc member 30 is fabricated from plastic (e.g., thermoplastic) and is the primary operating and seal retaining member of the assembly 10.

Disc member 30 typically includes a shaft member 34 (e.g., integral shaft member 34), a body portion 35 and a neck or extending portion 31. In exemplary embodiments, body portion 35 of disc member 30 is substantially oval shaped, substantially egg shaped and/or substantially tear-drop shaped (e.g., to substantially match the shape of port opening 22), although the present disclosure is not limited thereto. Rather, body portion 35 may take a variety of shapes/forms. Body portion 35 extends from a first end 42 to a second end 44, and includes a top surface 46 and a bottom surface 48. In exemplary embodiments, the first end 42 of the substantially oval shaped, substantially egg shaped and/or substantially tear-drop shaped body portion 35 is smaller in area/diameter/surface area compared to second end 44. This reduced area/diameter of first end 42 advantageously allows the disc member 30 to swing farther open when the disc member is forced to the open position, and also substantially prevents the first end 42 of the disc member 30 from contacting/engaging the interior of flow opening 51 of retainer member 50 or the inside surface of the adjoining pipe of flange 84 (FIG. 6). In contrast, conventional assemblies (e.g., with round disc members) typically strike the inside wall of the adjoining pipe after only opening about 40° to 45°, if spacers are not utilized.

Extending portion 31 (e.g., neck portion) typically extends from a first end 31A positioned on the top surface 46 to a second end 31B that is typically located/positioned: (i) past or beyond the outer edge of the second end 44 of body portion 35, and (ii) above the top surface 46. As such, extending portion 31 typically angles/tapers upwardly away from and/or beyond top surface 46. Second end 31B typically extends to, terminates at and/or is positioned proximal to shaft member 34 (e.g., it is integral with shaft member 34).

It is noted that by positioning/locating second end 31B past or beyond the outer edge of the second end 44 of body portion 35 and/or above the top surface 46 advantageously allows the axis of rotation of the shaft member 34 of the disc member 30 to be positioned/moved up and out of the flow path of the adjoining pipe or flange 84 (FIG. 6). By contrast, most conventional designs/assemblies place/position the shaft substantially immediately adjacent to, or tangent to, the main disc body, thereby requiring the shaft and axis of rotation to be placed in, or partially in the flow area of adjoining pipe or the like. This thereby typically results in the inefficient necessity of designing the conventional assemblies with smaller valve port areas.

Shaft member 34 (e.g., integral shaft member) typically extends from a first end 34A to a second end 34B. In general, shaft member 34 is substantially cylindrical, although the present disclosure is not limited thereto.

Figure 22:
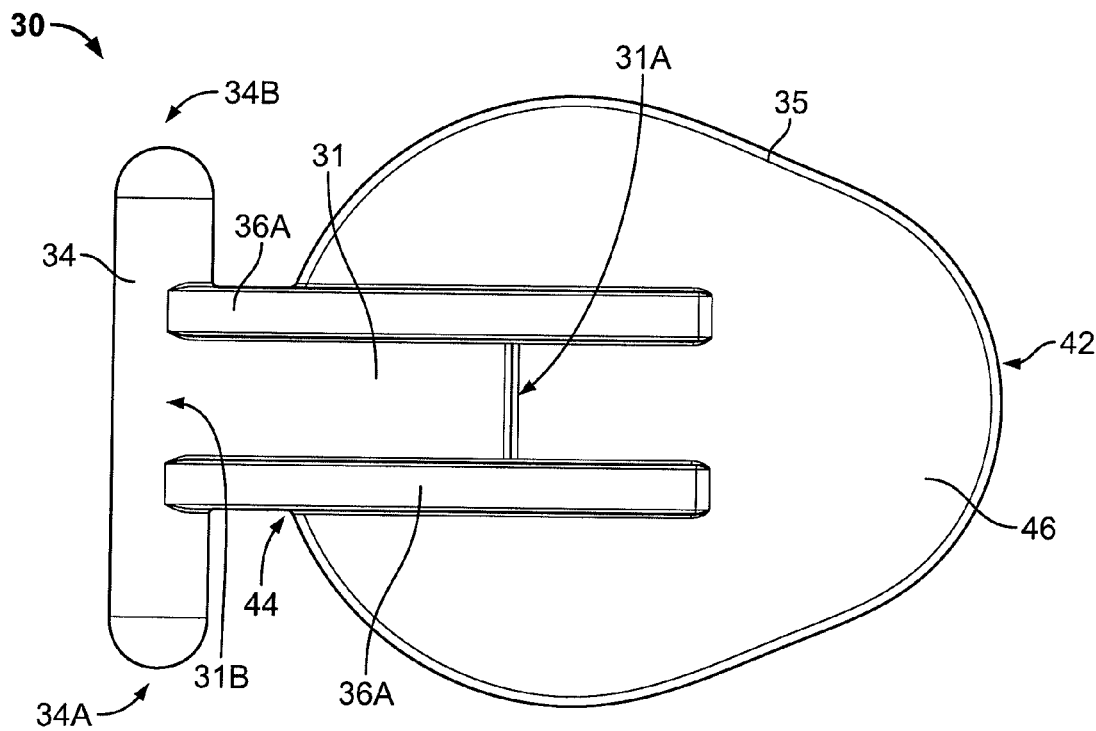
FIG. 22 is a top view of the disc member of FIG. 20.

In exemplary embodiments, shaft member 34 is asymmetrical in that the length from the center of the shaft member 34 to the first end 34A is longer than the length from the center of the shaft member 34 to the second end 34B (FIG. 22). Stated another way, first end 34A typically extends further from the center of extending portion 31 compared to the extension of second end 34B (without cap member 70) from the center of extending portion 31.

In certain embodiments and as noted above, once a cap member 70 or the like is mounted with respect to second end 34B of disc shaft 34 (FIG. 32), ends 34A, 34B are thereby substantially an equal distance from the center of the disc member 30. In other words, the length from the center of the disc shaft member 34 to the first end 34A is substantially equal to the length from the center of the disc shaft member 34 to the second end 34B when cap member 70 is mounted with respect to second end 34B.

Figure 32:
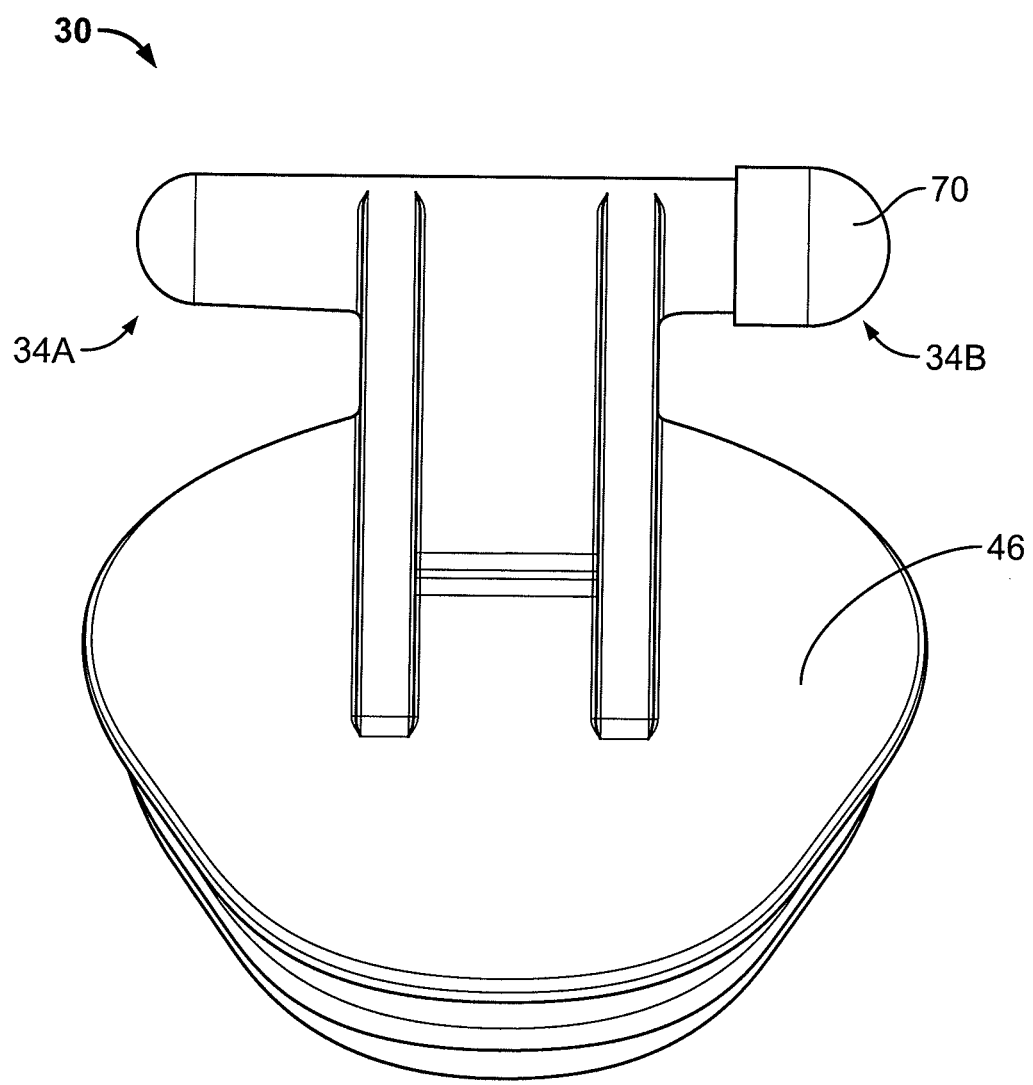
FIG. 32 is a front perspective view of the disc member of FIG. 20, with a cap member mounted thereon.

Referring again to FIG. 19 and with respect to smaller first end 19A of groove 19, it is again noted that exemplary smaller first end 19A substantially prevents improper installation/assembly of disc member 30 (e.g., shaft member 34) with respect to groove 19. In exemplary embodiments, a spring member 90 may be mounted to disc shaft 34 and thereby prevented from slipping off the disc shaft 34 (e.g., due to movement along shaft 34) by a cap member 70 that is mounted with respect to end 34B of disc shaft 34. As the cap member 70 is typically larger in diameter than the disc shaft 34, the larger second end 19B of the groove 19 is thereby configured to accommodate cap member 70 that is mounted with respect to end 34B of disc shaft 34. Moreover, mounted cap member 70 and/or larger second end 19B also facilitates the proper orientation of the disc member 30 relative to the body member 12 during the assembly process. For example, disc member 30 with cap member 70 mounted thereon provides/ensures that a user will insert/house the end of the disc member 30 having the cap member 70 in the larger second end 19B, thereby facilitating the proper orientation of the disc member 30 relative to the body member 12 during the assembly process (FIG. 32).

In some embodiments, cap member 70 or the like may be integral with an end (e.g., end 34B) of disc shaft 34 to thereby facilitate proper orientation of the disc member 30 relative to the body member 12 during the assembly process. Moreover, it is noted that the length from the center of the disc member 30 to the second end 34B may be longer than the length from the center of the disc member 30 to the first end 34A (and first end 19A or groove 19 may be larger than second end 19B). In some embodiments, the length from the center of the disc member 30 to the second end 34B may be substantially the same as the length from the center of the disc member 30 to the first end 34A.

In exemplary embodiments and as shown in FIG. 30, the top surface 46 and the bottom surface 48 are substantially planar. The side surface 35A of body portion 35 typically tapers/angles inwardly from the top surface 46 to the bottom surface 48.

In exemplary embodiments, side surface 35A of body portion 35 angles/tapers inwardly from the top surface 46 to the bottom surface 48 at an angle of about 12° to about 60° or more relative to fourth axis A4 (e.g., or relative to an axis (i.e., axis A4) that is transverse to an axis defined by the top surface 46 (i.e., axis A3)) (see, e.g., FIG. 7A). As shown in FIG. 7A, when the disc member 30 is in the closed position, the fourth axis A4 extends substantially through the center of the body portion 35 of the disc member 30. In one embodiment, the angle/taper of side surface 35A inwardly from the top surface 46 to the bottom surface 48 is about 20° relative to fourth axis A4. In exemplary embodiments, the angle/taper of side surface 35A (e.g., relative to fourth axis A4) substantially equals/matches the angle/taper of seating/sealing surface 28 of body member 12 (e.g., relative to fourth axis A4) (see FIG. 7A).

As noted, a groove 32 typically extends around side surface 35A of body portion 35 of disc member 30, with the groove configured to house/contain at least a portion of second gasketing material 38 within at least a portion of disc member groove 32. In exemplary embodiments, groove 32 is substantially positioned/located at the mid-point of side surface 35A (e.g., halfway between top surface 46 and bottom surface 48). In certain embodiments, the depth of groove 32 is configured and dimensioned to be deeper than conventional grooves, with about 10% of the gasketing material 38 surface protruding or extending from groove 32 when gasketing material 38 is housed within groove 32. In other words, groove 32 is configured to embed/house gasketing material 38 deeper into/within groove 32 than conventional grooves (e.g., conventional O-ring grooves). It is noted that deeper groove 32 advantageously overcomes the potential for fluid flow to remove/misplace the gasketing material 38 from groove 32 (e.g., by force of fluid flow, especially at high fluid velocities, or by suction generated by high fluid velocities). Additionally, to overcome the concerns related to removal of the gasketing material 38 by flow of fluid across the disc member 30 surface, the gasketing material 38 seal can be undersized to generate more resistance to removal.

Figure 21:
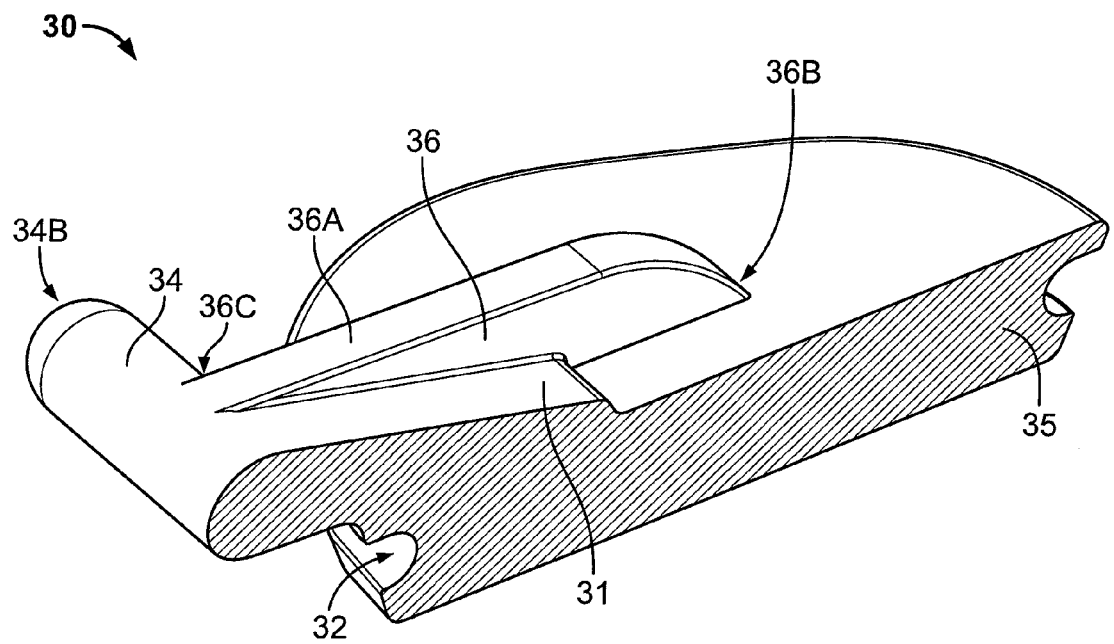
FIG. 21 is a cross-sectional side perspective view of the disc member of FIG. 20.
Figure 23:
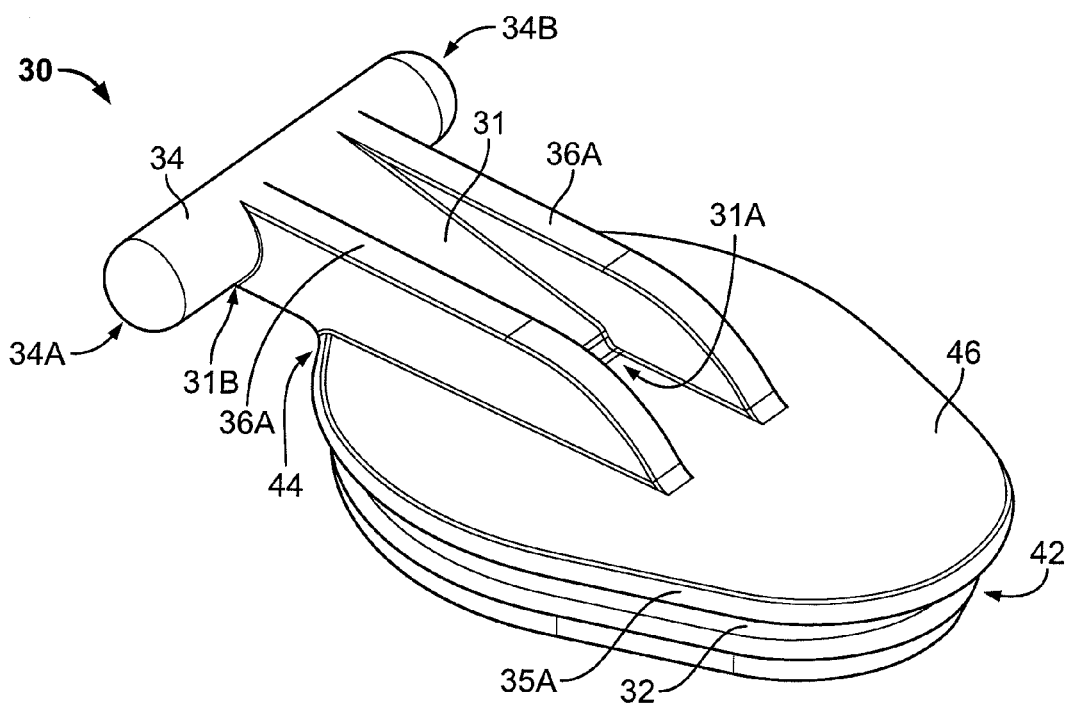
FIG. 23 is a top perspective view of the disc member of FIG. 20.
Figure 24:
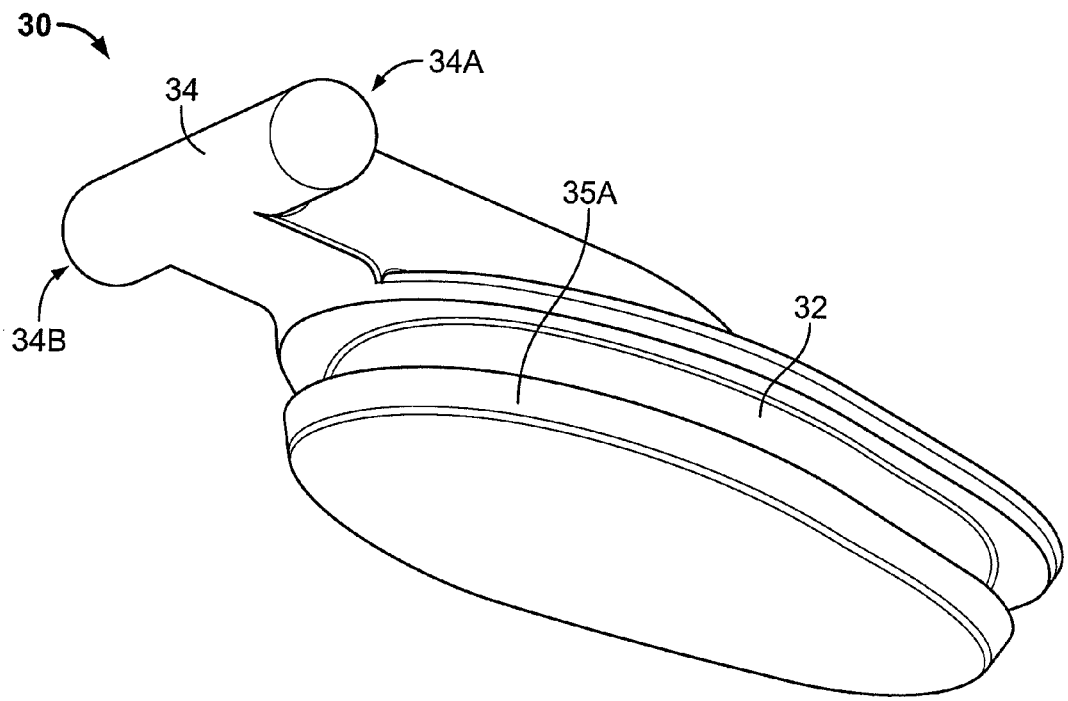
FIG. 24 is a bottom perspective view of the disc member of FIG. 20.
Figure 25:
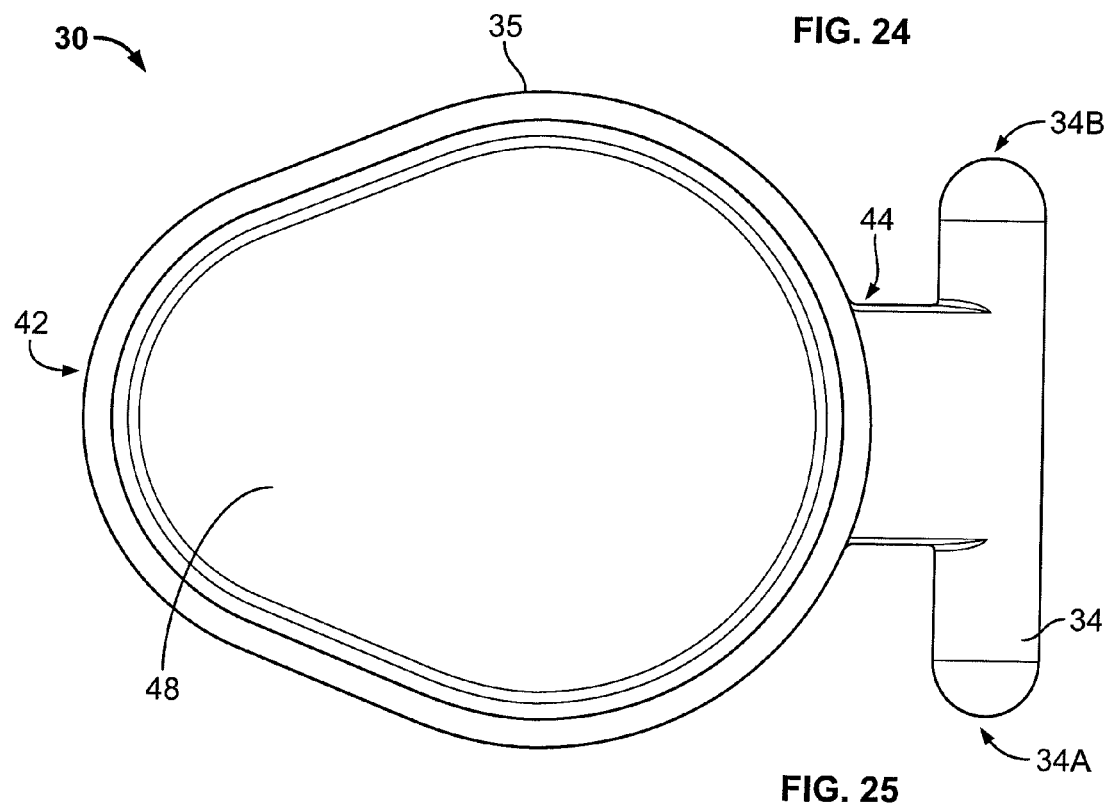
FIG. 25 is a bottom view of the disc member of FIG. 20.

In exemplary embodiments and as shown in FIGS. 21-23, extending portion 31 typically connects the shaft member 34 with the body portion 35. In one embodiment, extending portion 31 is substantially rectangular in shape or section, and includes at least one rib member 36 (e.g., strengthening rib member) positioned proximal thereto and extending from top surface 46. Each rib member 36 typically extends from a first end 36B to a second end 36C.

In certain embodiments, extending portion 31 includes two rib members 36, with each rib member 36 extending: (i) along an outer edge of the extending portion 31, and (ii) above at least a portion of the extending portion 31. In general, rib members 36 provide strength to extending portion 31. It is noted that disc member 30 may include any number of rib members 36 (e.g., one, two, three, etc.).

As noted above, a mating surface 59A (e.g., angled or tapered mating surface 59A) of each rib member 59 of retainer member 50 is configured and dimensioned to engage/interact with at least a portion of the top surface 36A (e.g., angled or tapered surface 36A) of rib member 36 of disc member 30 when: (i) disc shaft 34 is housed/positioned within groove 19 of body member 12, (ii) retainer member 50 and body member 12 are engaged/mated together, and (iii) disc member is forced to the open position (see, e.g., FIGS. 4, 6 and 8). Such engagement and/or interaction of surfaces 59A, 36A advantageously limits the travel of the disc member 30 when the disc member is forced to the open position, and also substantially prevents the first end 42 of the disc member 30 from contacting/engaging the interior of flow opening 51 of retainer member 50 or the inside surface of the adjoining pipe of flange 84 (FIG. 6).

In exemplary embodiments, mating surface 58A includes two rib members 59 and disc member 30 includes two rib members 36, and each rib member 59 is configured and dimensioned to engage/interact with at least a portion of the top surface 36A of a rib member 36 of disc member 30 when: (i) disc shaft 34 is housed/positioned within groove 19 of body member 12, (ii) retainer member 50 and body member 12 are engaged/mated together, and (iii) disc member is forced to the open position.

Figure 3:
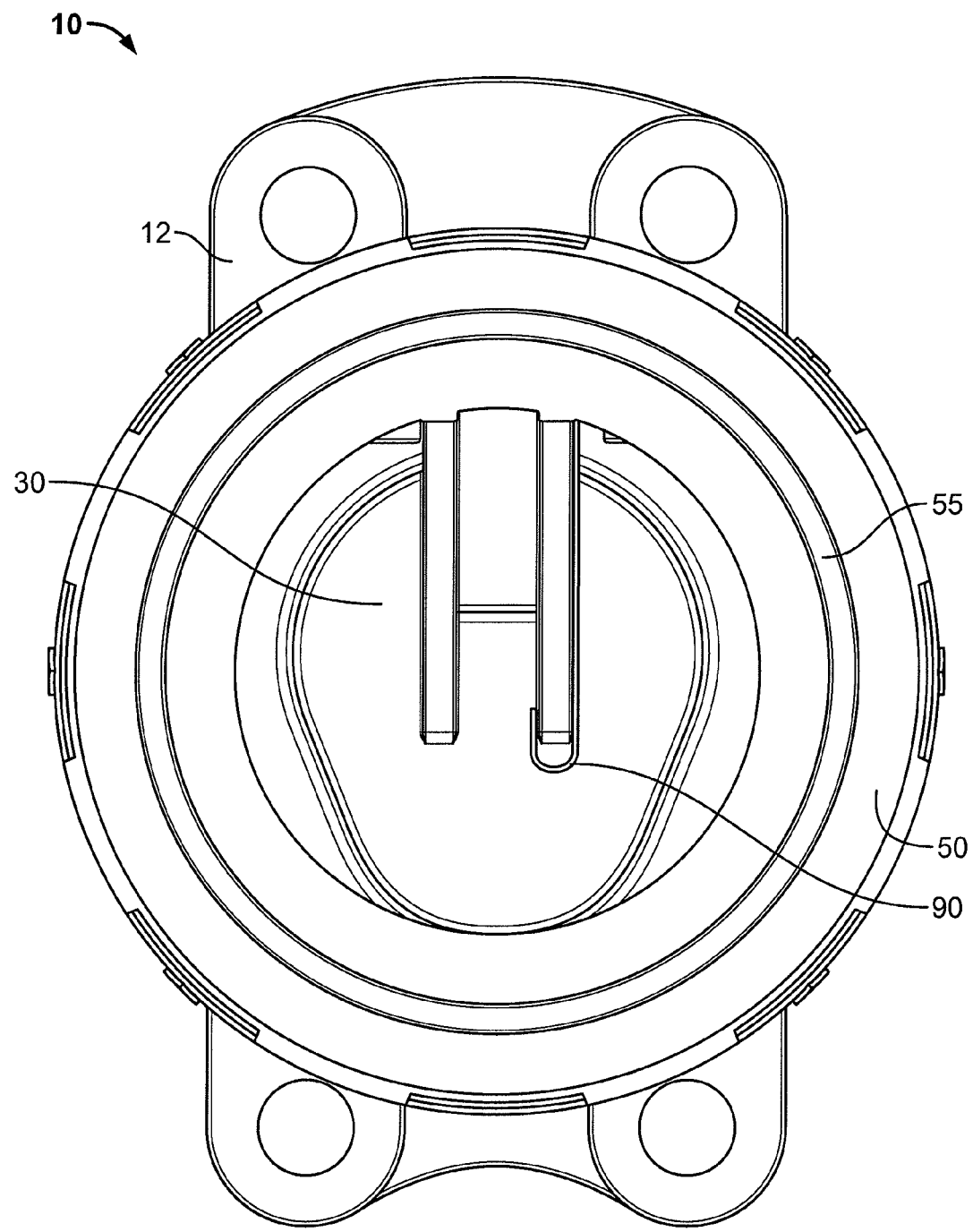
FIG. 3 is a rear view of the wafer check valve assembly of FIG. 1.
Figure 4:
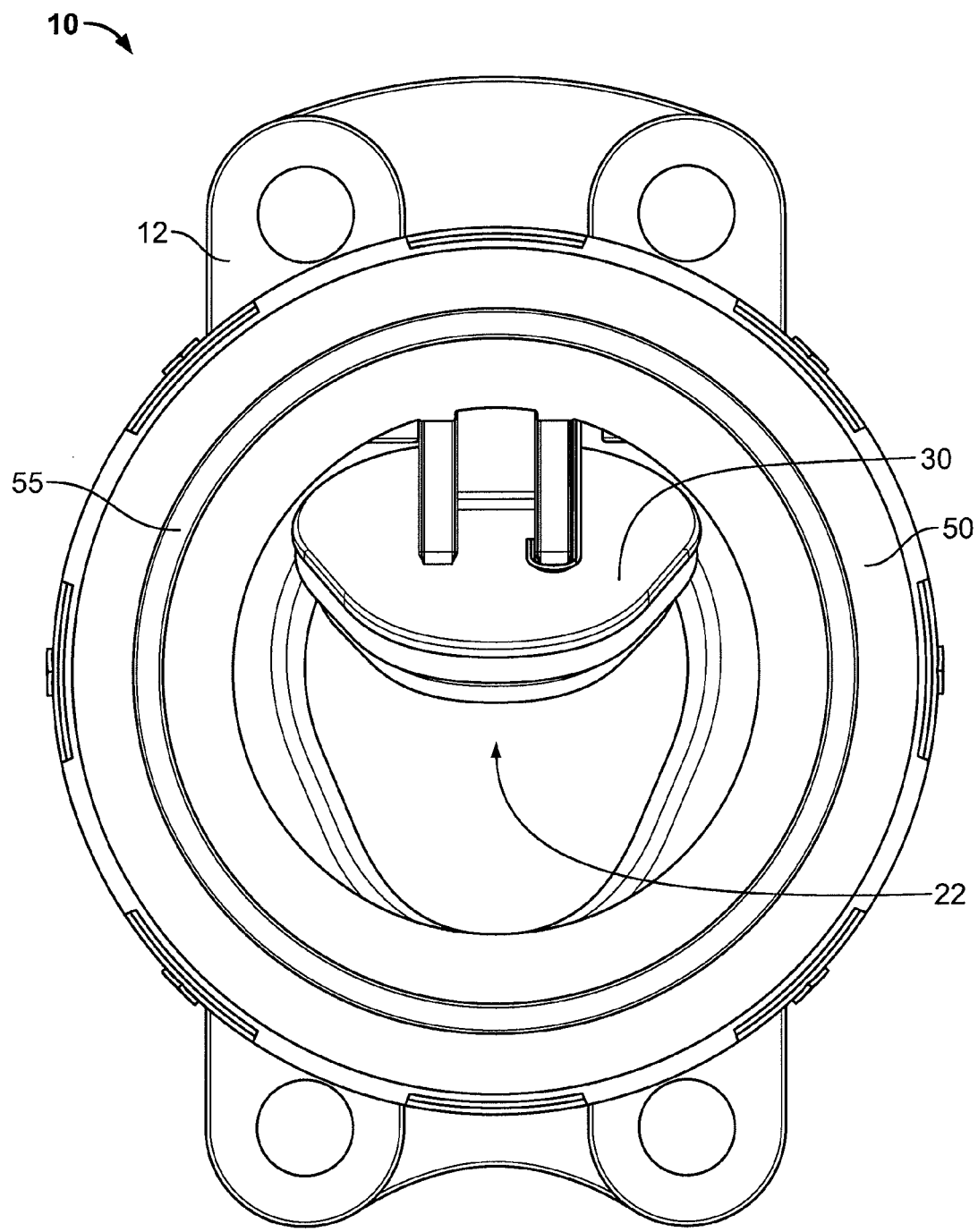
FIG. 4 is another rear view of the wafer check valve assembly of FIG. 1.

Moreover and as further discussed below, the hook portion 92 of the first leg portion 94 of the spring member 90 typically hooks around one of the rib members 36 (e.g., first end 36B) and substantially prevents the first leg portion 94 of spring member 90 from floating or moving from side to side as the disc member 30 is opened and closed (see, e.g., FIGS. 3 and 31).

Figure 31:
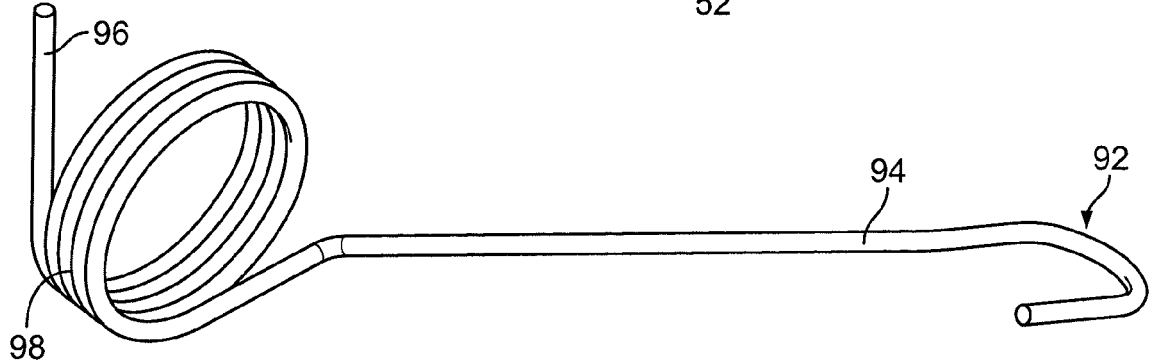
FIG. 31 is a side perspective view of an exemplary spring member for a wafer check valve assembly in accordance with an exemplary embodiment of the present disclosure.

In exemplary embodiments and as shown in FIG. 31, spring member 90 is a torsion spring or the like and includes a first leg portion 94 (e.g., long leg portion), a second leg portion 96 (e.g., short leg portion) and a coil portion 98. First leg portion 94 typically terminates at hook portion 92 (e.g., integral hook portion). When desired by a user, spring member 90 may be assembled to disc member 30. However, it is to be noted that certain embodiments of assembly 10 do not require the use of spring member 90.

In exemplary embodiments, the spring member 90 is typically mounted with respect to second end 34B of shaft member 34, although the present disclosure is not limited thereto. In general, the coil portion 98 is slid/positioned over the second end 34B and onto/around shaft member 34. A cap member 70 or the like (FIGS. 13-14) is then typically positioned or mounted with respect to second end 34B to retain/house the spring member 90 with respect to shaft member 34. The first leg portion 94 is then placed/positioned over top surface 46 of disc member 30, and the hook portion 92 is engaged around and/or mounted with respect to first end 36B of rib member 36 (e.g., rib member 36 proximal to end 34B) (see, e.g., FIG. 3).

In exemplary embodiments, at least a portion of second leg portion 96 of spring member 90 engages and/or is housed/positioned within spring groove 99 of mating side 26 of body member 12, when disc member 30 is mounted with respect to groove 19 (FIG. 19). In general, at least a portion of groove 19 forms/defines spring groove 99.

In exemplary embodiments, when disc member 30 is mounted with respect to groove 19 of body member 12, at least a portion of second leg portion 96 is engaged against body member 12 (e.g., spring groove 99). A user would then typically rotate second leg portion 96 several degrees, which thereby begins to wind spring member 90 slightly. In general, under full system operation of assembly 10, the assembled spring member 90 acts as a dampener to substantially prevent the disc member 30 from slamming into the open position. Moreover, when the system of operation of assembly 10 is shut down, the spring member 90 biases the disc member 30 toward the closed position so that the disc member 30 closes faster than would normally occur with gravitational reversal of fluid flow. Spring member also aids assemblies 10 installed in substantially horizontal piping systems to achieve a seal, again by biasing the disc member 30 toward the closed position. In exemplary embodiments, since the seating/sealing surface 28 of body member 12 is typically angled/tapered inwardly toward the center of port 22 at an angle of about 12° to about 60° or more relative to fourth axis A4 (FIG. 7A), spring member 90 will advantageously move/push/bias the disc member 30 to the closed position sooner as compared to conventional designs, especially when assembly is in the substantially horizontal position. It is to be noted that in exemplary embodiments, it is not the intent of the spring member 90 to close the disc member 30 and aid the seal in closing the disc member 30; rather the spring member 90 is a biasing means, but typically does not generate enough force against the disc member 30 to cause it to seal (e.g., against seating/sealing surface 28). Notwithstanding, it is contemplated that a spring member may be provided with biasing force for sealing as such.

As noted above and as shown in FIGS. 13-14 and 8, assembly 10 also may include cap member 70. In general, cap member 70 is a thin-wall, hollow cap member. Cap member 70 typically includes an integral substantially cylindrical component 72, and an integral substantially hemispherical component 74. In exemplary embodiments, cap member 70 is configured and dimensioned to be placed/positioned over first or second end 34A, 34B of shaft member 34 of disc member 30 to facilitate/ensure that the disc member 30 is installed/assembled with respect to body member 30 in the proper orientation/alignment. Moreover, when a user desires to utilize a spring member 90 in conjunction with assembly 10, the cap member 70 acts as a retainer to properly position the spring member 90 onto/around disc shaft member 34, and to prevent the spring member 90 from sliding off of an end of the shaft member 34 during assembly or while assembly 10 is in operation.

In exemplary embodiments, cap member 70 is fabricated via machining, or by injection molding or the like, although the present disclosure is not limited thereto. In certain embodiments, cap member 70 is configured and dimensioned to be press fit onto an end of the shaft member 34 during assembly. Alternatively, cap member 70 may be configured and dimensioned to be slid/positioned over an end of the shaft member 34 during assembly (e.g., in a substantially loose condition/state), and then is restrained by the body member 12 and/or retainer member 50 after assembly. In exemplary embodiments and as noted above, after cap member 70 is mounted with respect to an end of disc shaft member 34, the cap member 70 acts to substantially equalize the disc center to ends (34A, 34B) dimensions of the shaft member 34 from end 34A to end 34B (e.g., the length from the center of the disc shaft member 34 to the first end 34A is substantially equal to the length from the center of the disc shaft member 34 to the second end 34B when cap member 70 is mounted with respect to second end 34B).

In exemplary embodiments and as noted above, wafer check valve assembly 10 is assembled by first positioning/housing at least a portion of the second gasketing material 38 within at least a portion of disc member groove 32.

Next, a cap member 70 typically would be mounted with respect to second end 34B of disc shaft 34. At least a portion of shaft member 34 would then be positioned within a mating groove 19 of body member 12 (FIG. 19). Next, the body portion 35 of the disc member 30 would be positioned/located within the port opening 22 of the body member 12.

The first gasketing material 82 would then be positioned around/over protrusion 58 of retainer member 50. The mating side 61 of the retainer member 50 would then be mated/engaged with the mating side 26 of the body member 12, while positioning at least a portion of at least one alignment boss 52 of the retainer member 50 within at least a portion of at least one pocket or recess 16 of body member 12, thereby ensuring proper alignment (e.g., rotational alignment) of the engaged retainer member 50 and body member 12.

Figure 8:
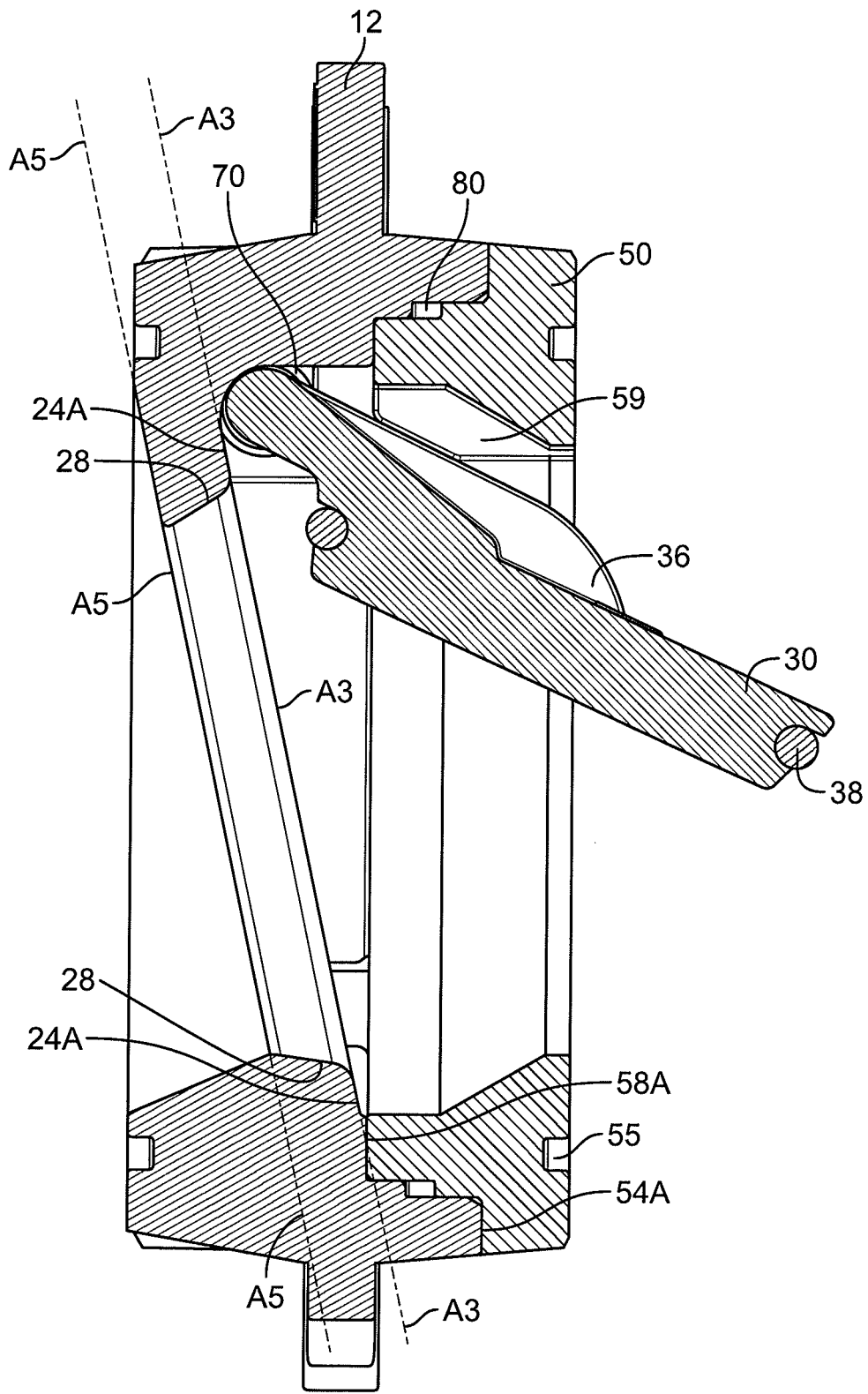
FIG. 8 is another cross-sectional side view of the wafer check valve assembly of FIG. 1.
Figure 9:
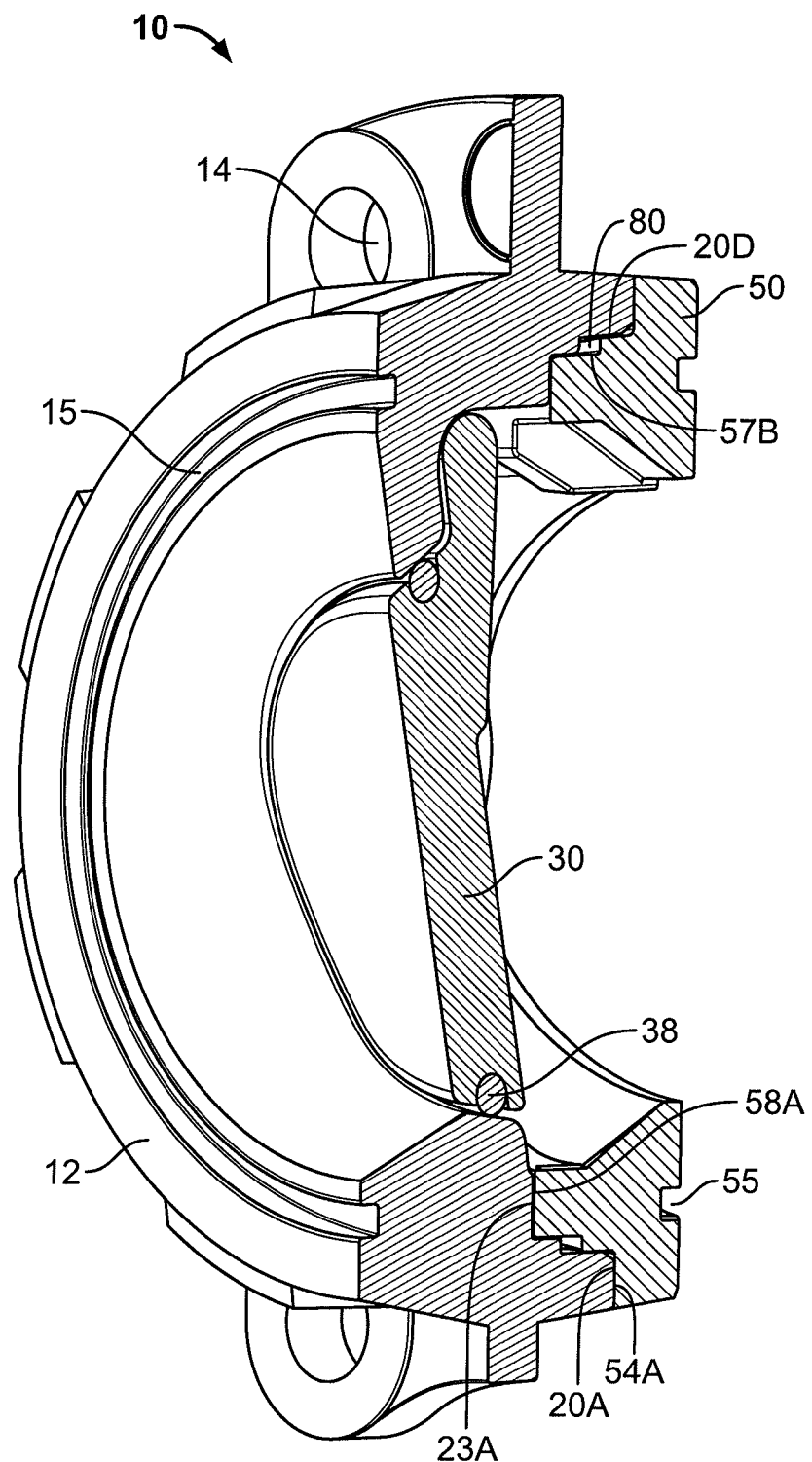
FIG. 9 is a cross-sectional side perspective view of the wafer check valve assembly of FIG. 1.
Figure 10:
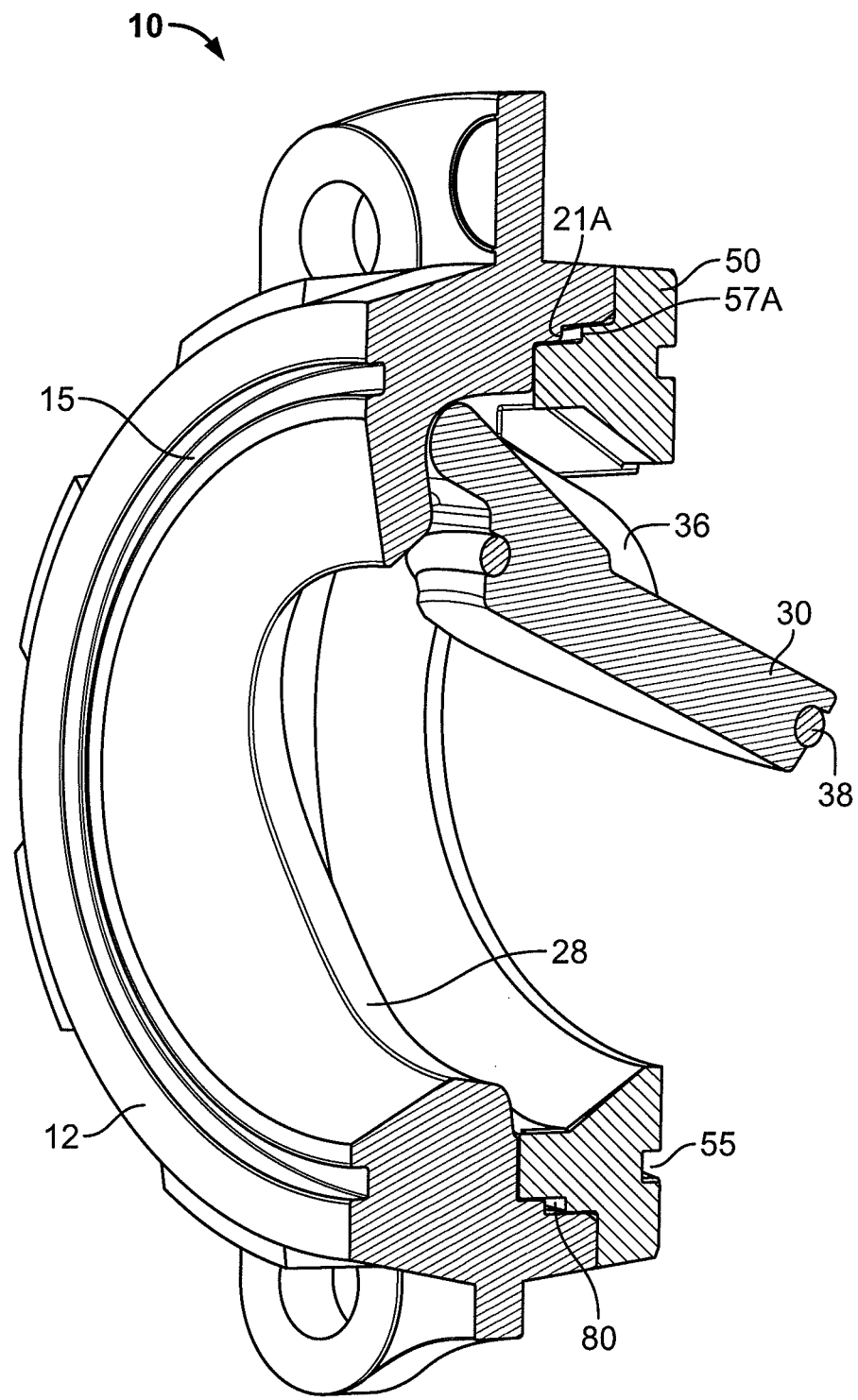
FIG. 10 is another cross-sectional side perspective view of the wafer check valve assembly of FIG. 1.
Figure 11:
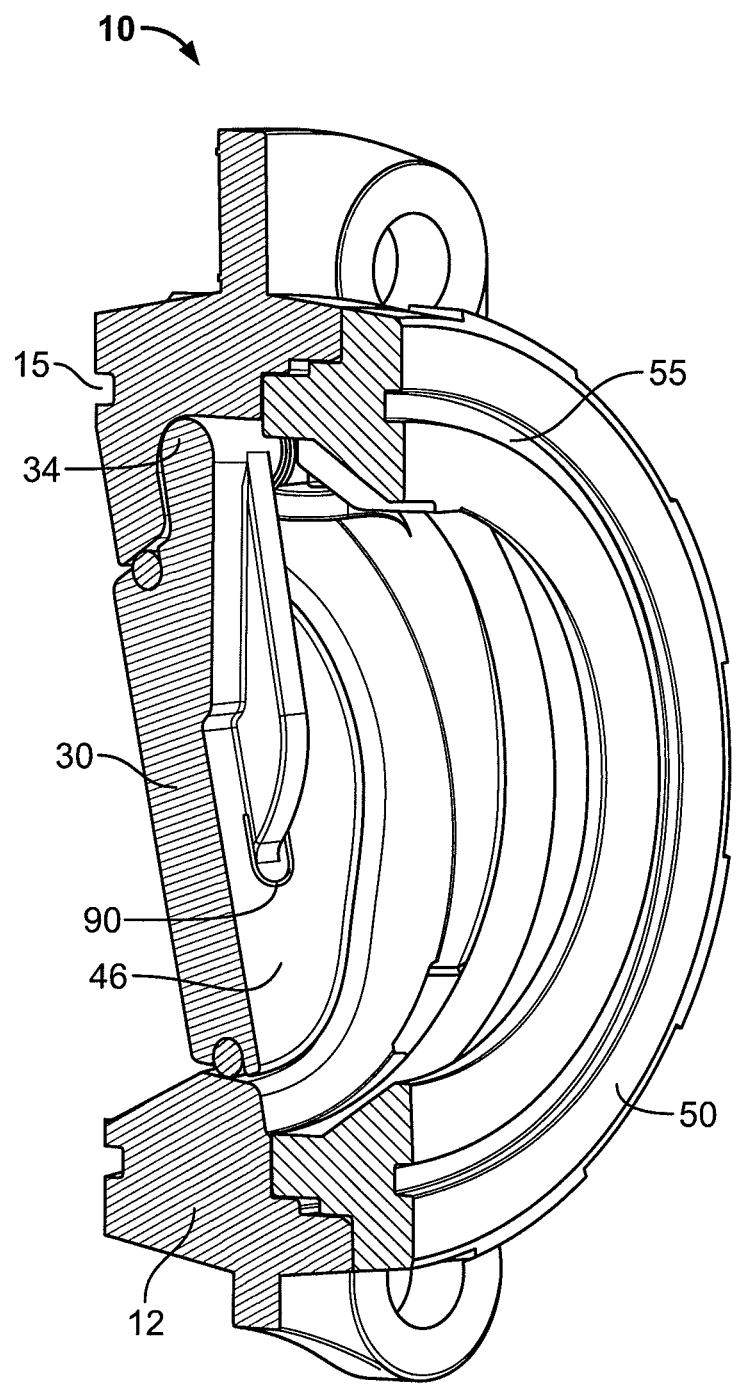
FIG. 11 is another cross-sectional side perspective view of the wafer check valve assembly of FIG. 1.
Figure 12:
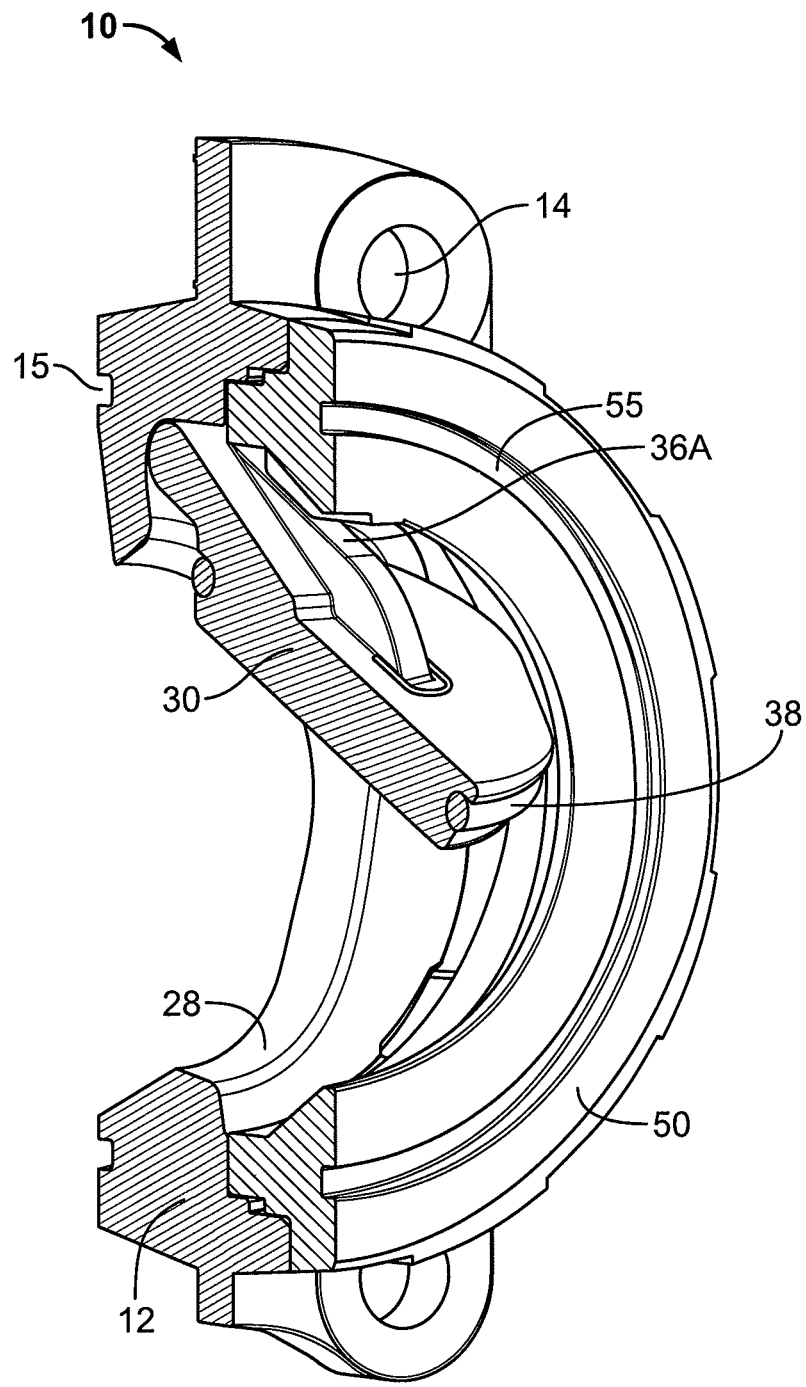
FIG. 12 is another cross-sectional side perspective view of the wafer check valve assembly of FIG. 1.

The retainer member 50 would then be engaged/mated with the body member 12 until at least a portion of the mating surface 54A of retainer member 50 engaged, contacted and/or was positioned proximal to the mating surface 20A of body member 12, and/or until at least a portion of the mating surface 58A of retainer member 50 engaged, contacted and/or was positioned proximal to the mating surface 23A of body member 12 (FIGS. 7 and 8).

Such positioning of retainer member 50 relative to body member 12 thereby forms mating pocket or notch 80 that is utilized as the primary body member 12/retainer member 50 seal via first gasketing material 82 positioned within formed mating pocket/notch 80 (FIGS. 5 and 7). When body member 12 and retainer member 50 are mated/engaged together, mating pocket/notch 80 is formed or defined by at least a portion of: (i) first intermediate surface 21A of body member 12, (ii) inner surface 20D of mating surface 20A, (iii) first intermediate surface 57A of retainer member 50, and (iv) inner extending surface 57B of retainer member 50 (see, e.g, FIGS. 7-8).

In this state/position, at least one protruding or extending column 53 of retainer member 50 is positioned proximal to the shaft member 34 of the disc member 30 housed within groove 19 to allow rotation of the disc member 30, while substantially preventing translation of the disc member parallel to the main center axis A1 of assembly 10 (FIGS. 7 and 7A).

As such, the wafer check valve assembly 10 is now fully assembled and the rotatable disc member 30 is restrained and/or housed within engaged retainer member 50/body member 12 without the use of fasteners, and while utilizing the first gasketing material 82 positioned within formed mating pocket/notch 80 as the primary body member 12/retainer member 50 seal. Assembly 10 may then be utilized in fluid systems as a flow control assembly, e.g., assembled wafer check valve assembly 10 may be mounted with respect to flanges 84 in an exemplary piping system 89 or the like via apertures 14 of body member 12 (FIGS. 5-6).

As noted, the seating/sealing surface 28 of body member 12 is typically angled/tapered inwardly toward the center of port 22 at an angle of about 12° to about 60° or more relative to fourth axis A4 (FIG. 7A). In exemplary embodiments, angling the seating/sealing surface 28 advantageously allows the center of gravity of the disc member 30 to be used for a mechanical advantage (e.g., when the wafer check valve assembly 10 is installed in a substantially horizontal orientation). For example, with the assembly installed in the horizontal orientation, the natural bias of the disc member 30 is to drop down into the seating/sealing surface 28.

Moreover, the center of gravity of the disc member 30 in a free-hanging condition is inside of the angle of the seating/sealing surface 28 (e.g., towards inlet side 13), so that the seating/sealing surface 28 effectively catches the disc member 28 before it is allowed to reach its gravitationally natural position, thus using the center of gravity of the disc member 30 advantageously to affect a seal with the assembly 10 installed in a horizontal orientation (see, e.g., FIG. 7A). As such, the gravitational force affecting the disc member 30, in conjunction with the angled seating/sealing surface 28, will advantageously move the disc member 30 to the closed position sooner as compared to conventional designs, especially when assembly is in the substantially horizontal position.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A wafer check valve assembly comprising:
a body member having a mating side and an inlet side, the body member mating side including first, second and third mating surfaces and a shaft groove, wherein a tapered surface of the mating side of the body member extends from the third mating surface of the body member toward the inlet side of the body member from a first end of a port opening to a second end of the port opening;
a retainer member having a mating side and an outlet side, the retainer member mating side including fourth, fifth and sixth mating surfaces and a first gasketing material positioned proximal to the fifth mating surface;
a disc member provided with a shaft member;
wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together.

2. The assembly of claim 1, wherein the body member is hollow and defines the port opening, the body member having a sealing surface proximal to the port opening;
    wherein the retainer member is hollow and defines an outlet opening;
    wherein the disc member includes a body portion having a groove housing a second gasketing material, the shaft member extending from the body portion; and
    wherein the rotatably housed disc member is allowed to rotate between: (i) a closed position where the second gasketing material forms a seal with the sealing surface to fluidically seal the port opening, and (ii) an open position where the body portion of the disc member is positioned to allow fluid to flow from the port opening to the outlet opening.

3. The assembly of claim 2, wherein the port opening and the body portion of the disc member define a shape that is selected from the group consisting of a substantially oval shape, a substantially egg shape and a substantially tear-drop shape.

4. The assembly of claim 3, wherein the body portion of the disc member extends from a first end to a second end, the first end having a smaller surface area than the second end.

5. The assembly of claim 2, wherein the inlet side of the body member includes a seventh mating surface having a first seal groove housing a third gasketing material;
    wherein the outlet side of the retainer member includes an eighth mating surface having a second seal groove housing a fourth gasketing material; and
    wherein the seventh mating surface and the third gasketing material are configured to form a seal with a first flange member of a fluid system and the eighth mating surface and the fourth gasketing material are configured to form a seal with a second flange member of the fluid system.

6. The assembly of claim 5, wherein the inlet side of the body member includes a flow transition area that extends and tapers from an outer edge proximal to the seventh mating surface to an inner edge proximal to the port opening.

7. The assembly of claim 2, wherein the interior of the outlet opening of the retainer member proximal to the mating side of the retainer member includes an interior cylindrical section that extends from an inner edge of the mating side to an interior angled section that extends from the cylindrical section to an inner edge of the outlet side of the retainer member.

8. The assembly of claim 2, wherein the body portion of the disc member includes a top surface and an extending portion that extends from a first end positioned on the top surface to a second end positioned: (i) beyond an outer edge of the body portion; and (ii) above the top surface.

9. The assembly of claim 8, wherein the second end of the extending portion is proximal to and integral with the shaft member of the disc member.

10. The assembly of claim 2, wherein the body portion of the disc member includes a top surface, a bottom surface, and a side surface that tapers inwardly from the top surface to the bottom surface; and
    wherein the groove of the disc member is positioned on the side surface.

11. The assembly of claim 10, wherein the top surface of the disc member defines a first axis;
    wherein the side surface tapers inwardly at an angle from about 12° to about 60° relative to a second axis, the second axis transverse to the first axis.

12. The assembly of claim 10, wherein the disc member groove is configured to house the second gasketing material so that about 10% of the surface of the second gasketing material extends from the disc member groove.

13. The assembly of claim 1, wherein a first axis is defined by and extends through the mating of the third and sixth mating surfaces; and
    wherein the angle of taper of the tapered surface of the mating side of the body member is from about 1° to about 45° relative to the first axis.

14. The assembly of claim 13, wherein the angle of taper of the tapered surface of the mating side of the body member is about 12° relative to the first axis.

15. The assembly of claim 13, wherein the tapered surface of the mating side of the body member defines a second axis; and
    wherein the sealing surface extends from the tapered surface of the mating side to the port opening on the inlet side at an angle from about 12° to about 60° relative to a third axis, the third axis transverse to the second axis.

16. The assembly of claim 15, wherein the sealing surface extends from the tapered surface of the mating side of the body member to the port opening on the inlet side at an angle of about 20° relative to the third axis.

17. The assembly of claim 1, wherein the first end of the port opening is positioned a shorter distance away from the outlet side of the retainer member than the second end of the port opening when the body member and the retainer member are releasably mated together.

18. A wafer check valve assembly comprising:
    a body member having a mating side and an inlet side, the body member mating side including, second and third mating surfaces and a shaft groove;
    a retainer member having a mating side and an outlet side, the retainer member mating side including fourth, fifth and sixth mating surfaces and a first gasketing material positioned proximal to the fifth mating surface;
    a disc member provided with a shaft member;
    wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together;
    wherein the third mating surface of the body member includes at least one pocket;
    wherein the sixth mating surface of the retainer member includes at least one alignment boss extending therefrom; and wherein when the body member and the retainer member are releasably mated together, at least a portion of the at least one alignment boss is positioned within at least a portion of the at least one pocket to facilitate proper alignment of the mated body member and retainer member, and to substantially prevent rotation of the retainer member relative to the body member.

19. A wafer check valve assembly comprising:
a body member having a mating side and an inlet side, the body member mating side including first, second and third mating surfaces and a shaft groove;
a retainer member having a mating side and an outlet side, the retainer member mating side including fourth, fifth and sixth mating surfaces and a first gasketing material positioned proximal to the fifth mating surface;
a disc member provided with a shaft member;
wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together;
wherein the shaft groove extends from a first end to a second end, the second end larger in diameter than the first end;
wherein the shaft member of the disc member extends from a first end to a second end, the second end larger in diameter than the first end;
wherein the first end of the shaft groove inhibits from being housed therein the larger second end of the shaft member; and
wherein when the disc member is rotatably housed within at least a portion of the shaft groove, the first end of the shaft member is positioned within the first end of the shaft groove and the second end of the shaft member is positioned within the second end of the shaft groove to facilitate proper alignment of the disc member relative to the body member.

20. The assembly of claim 19, wherein the larger second end of the shaft member includes a cap member.

21. The assembly of claim 20, wherein the cap member is mounted with respect to the second end of the shaft member to prevent a spring member mounted with respect to the second end of the shaft member from sliding off of the second end of the shaft member.

22. The assembly of claim 20, wherein the cap member is integral with the second end of the shaft member.

23. A wafer check valve assembly comprising:
a body member having a mating side and an inlet side, the body member mating side including first, second and third mating surfaces and a shaft groove;
a retainer member having a mating side and an outlet side, the retainer member mating side including fourth, fifth and sixth mating surfaces and a first gasketing material positioned proximal to the fifth mating surface;
a disc member provided with a shaft member;
wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together;
wherein the sixth mating surface of the retainer member includes at least one column member extending therefrom; and
wherein when the body member, retainer member and disc member are releasably mated together, the at least one column member rotatably housing the shaft member between the body member and the retainer member and within at least a portion of the shaft groove, while substantially preventing the shaft member from moving in the lateral and axial directions.

24. A wafer check valve assembly comprising:
a hollow body member having a mating side and an inlet side, the body member mating side including first, second and third mating surfaces and a shaft groove, the body member defining a port opening and having a sealing surface proximal to the port opening;
a retainer member having a mating side and an outlet side, the retainer member mating side including fourth, fifth and sixth mating surfaces and a first gasketing material positioned proximal to the fifth mating surface;
a disc member provided with a shaft member;
wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together;
wherein the retainer member is hollow and defines an outlet opening;
wherein the disc member includes a body portion having a groove housing a second gasketing material, the shaft member extending from the body portion; and
wherein the rotatably housed disc member is allowed to rotate between: (i) a closed position where the second gasketing material forms a seal with the sealing surface to fluidically seal the port opening, and (ii) an open position where the body portion of the disc member is positioned to allow fluid to flow from the port opening to the outlet opening;
wherein the sixth mating surface of the retainer member includes at least one rib member extending downwardly from the sixth mating surface toward the outlet opening, the at least one rib member including a first engagement surface;

wherein the body portion of the disc member includes a rib member extending from a top surface, the disc member rib member including a second engagement surface; and wherein when the disc member is rotated to the open position, the engagement of the first and second engagement surfaces limits the travel of the disc member in the open position and substantially prevents contact between the disc member and an inside wall of a downstream pipe.

25. A wafer check valve assembly comprising:

a body member having a mating side and an inlet side, the body member mating side including first, second and third mating surfaces and a shaft groove;

a retainer member having a mating side and an outlet side, the retainer member mating side including fourth, fifth and sixth mating surfaces and a first gasketing material positioned proximal to the fifth mating surface;

a disc member provided with a shaft member, wherein the shaft member of the disc member extends from a first end to a second end, the first end extending a further distance from a central axis of the disc member than the second end;

wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together.

26. The assembly of claim 25 further comprising a cap member mounted with respect to the second end of the shaft member.

27. A wafer check valve assembly comprising:

a hollow body member having a mating side and an inlet side, the body member mating side including first, second and third mating surfaces and a shaft groove, the body member defining a port opening and having a sealing surface proximal to the port opening;

a retainer member having a mating side and an outlet side, the retainer member mating side including fourth, fifth and sixth mating surfaces and a first gasketinq material positioned proximal to the fifth mating surface;

a disc member provided with a shaft member; and a spring member mounted with respect to the shaft member of the disc member, the spring member extending from a first end to a second end;

wherein, when the body member, retainer member and disc member are releasably mated together: (i) at least a portion of the shaft member of the disc member is rotatable housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together;

wherein the retainer member is hollow and defines an outlet opening;

wherein the disc member includes a body portion having a groove housing a second gasketing material, the shaft member extending from the body portion;

wherein the rotatably housed disc member is allowed to rotate between: (i) a closed position where the second gasketing material forms a seal with the sealing surface to fluidicallv seal the port opening, and (ii) an open position where the body portion of the disc member is positioned to allow fluid to flow from the port opening to the outlet opening;

wherein the shaft member extends from a first end to a second end;

wherein the body portion of the disc member includes a rib member extending: (i) from a top surface of the disc member, and (ii) from a first end to a second end; and wherein the first end of the spring member is configured to be mounted with respect to the second end of the shaft member, and the second end of the spring member is configured to be mounted with respect to the first end of the rib member.

28. A wafer check valve assembly comprising:

a hollow body member defining a port opening, the body member having a mating side, an inlet side and an angled sealing surface proximal to the port opening, the body member mating side including first, second and third mating surfaces and a shaft groove, wherein a tapered surface of the mating side of the body member extends from the third mating surface of the body member toward the inlet side of the body member from a first end of the port opening to a second end of the port opening;

a hollow retainer member defining an outlet opening, the retainer member having a mating side and an outlet side, the retainer member mating side including fourth, fifth and sixth mating surfaces and a first gasketing material positioned proximal to the fifth mating surface;

a disc member having a body portion that includes a groove housing a second gasketing material, the body portion including a shaft member that extends from the body portion;

wherein, when the body member, retainer member and disc member are releasably mated together: (i) at least a portion of the shaft member of the disc member is rotatably housed between the body member and the retainer member and within at least a portion of the shaft groove of the body member, (ii) at least a portion of the first and fourth mating surfaces are positioned proximal to one another, (iii) at least a portion of the second and fifth mating surfaces are positioned proximal to one another, and (iv) at least a portion of the third and sixth mating surfaces are positioned proximal to one another, so to define a mating pocket that houses the first gasketing material, the first gasketing material thereby forming a seal between the body member and the retainer member to releasably secure the body member, retainer member and the disc member together; and wherein the rotatably housed disc member is allowed to rotate between: (i) a closed position where the second gasketing material forms a seal with the angled sealing surface to fluidically seal the port opening, and (ii) an open position where the body portion of the disc member is positioned to allow fluid to flow from the port opening to the outlet opening.

29. The assembly of claim 28,
wherein the tapered surface of the mating side of the body member defines a first axis; and
wherein the sealing surface extends from the tapered surface of the mating side to the port opening on the inlet side at an angle from about 12° to about 60° relative to a second axis, the second axis transverse to the first axis.

30. The assembly of claim 29, wherein the port opening and the body portion of the disc member define a shape that is selected from the group consisting of a substantially oval shape, a substantially egg shape and a substantially tear-drop shape.

31. The assembly of claim 30, wherein the body portion of the disc member includes a top surface, a bottom surface, and a side surface that tapers inwardly from the top surface to the bottom surface;
wherein the groove of the disc member is positioned on the side surface;
wherein the top surface of the disc member defines a third axis; and
wherein the side surface tapers inwardly at an angle from about 12° to about 60° relative to a fourth axis, the fourth axis transverse to the third axis.

32. The assembly of claim 29, wherein the first end of the port opening is positioned a shorter distance away from the outlet side of the retainer member than the second end of the port opening when the body member and the retainer member are releasably mated together.

* * * * *